United States Patent
Seki et al.

(10) Patent No.: US 10,873,080 B2
(45) Date of Patent: Dec. 22, 2020

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Hayato Seki, Saitama (JP); Yumiko Sekiguchi, Kawasaki (JP); Kazuomi Yoshima, Yokohama (JP); Yasuyuki Hotta, Tokyo (JP); Shinsuke Matsuno, Tokyo (JP); Norio Takami, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 180 days.

(21) Appl. No.: 16/118,967

(22) Filed: Aug. 31, 2018

(65) Prior Publication Data
US 2019/0296344 A1 Sep. 26, 2019

(30) Foreign Application Priority Data

Mar. 22, 2018 (JP) .................................. 2018-054823
Aug. 23, 2018 (JP) .................................. 2018-156595

(51) Int. Cl.
*H01M 4/13* (2010.01)
*H01M 4/485* (2010.01)
(Continued)

(52) U.S. Cl.
CPC ............. *H01M 4/485* (2013.01); *B60L 50/64* (2019.02); *H01M 4/131* (2013.01); *H01M 4/36* (2013.01);
(Continued)

(58) Field of Classification Search
CPC ........ H01M 4/485; H01M 4/131; H01M 4/36; H01M 4/661; H01M 4/02; H01M 10/052;
(Continued)

(56) References Cited

U.S. PATENT DOCUMENTS

| 6,403,253 B1 | 6/2002 | Wainwright et al. |
| 2010/0015517 A1* | 1/2010 | Fujita ..................... H01M 4/14 |
| | | 429/149 |

(Continued)

FOREIGN PATENT DOCUMENTS

| EP | 3 220 459 A1 | 9/2017 |
| EP | 3 379 624 A1 | 9/2018 |

(Continued)

OTHER PUBLICATIONS

S. Liu et al. "Rechargeable Aqueous Lithium-Ion Battery of $TiO_2$/$LiMn_2O_4$ with a High Voltage," Journal of the Electrochemical Society, 158 (12), 2011, pp. A1490-A1497.

*Primary Examiner* — Raymond Alejandro
(74) *Attorney, Agent, or Firm* — Oblon, McClelland, Maier & Neustadt, L.L.P.

(57) ABSTRACT

A secondary battery including an aqueous electrolyte, a positive electrode, and a negative electrode. The negative electrode includes a negative electrode active material which contains a Ti-containing composite oxide. At least one element A selected from Hg, Pb, Zn, and Bi is present on a surface of the negative electrode. An average of molar ratios (A/(A+Ti)) of the element A ranges from 5% to 40%. Each of the molar ratios is a molar amount of the element A to a sum between the molar amount of the element A and a molar amount of Ti on the surface of the negative electrode, according to scanning electron microscopy-energy dispersive X-ray spectroscopy.

15 Claims, 8 Drawing Sheets

(51) Int. Cl.

| | |
|---|---|
| *B60L 50/64* | (2019.01) |
| *H01M 10/42* | (2006.01) |
| *H01M 4/131* | (2010.01) |
| *H01M 10/052* | (2010.01) |
| *H01M 4/66* | (2006.01) |
| *H01M 10/0569* | (2010.01) |
| *H01M 4/36* | (2006.01) |
| *H01M 4/02* | (2006.01) |
| *B60L 50/50* | (2019.01) |
| *H01M 10/0567* | (2010.01) |

(52) U.S. Cl.
CPC ......... *H01M 4/661* (2013.01); *H01M 10/052* (2013.01); *H01M 10/0569* (2013.01); *H01M 10/425* (2013.01); *B60L 50/50* (2019.02); *H01M 4/02* (2013.01); *H01M 10/0567* (2013.01); *H01M 2004/027* (2013.01); *H01M 2010/4271* (2013.01); *H01M 2300/0002* (2013.01)

(58) Field of Classification Search
CPC ........... H01M 10/0569; H01M 10/425; H01M 10/0567; H01M 2004/027; H01M 2010/4271; H01M 2300/0002; B60L 50/64; B60L 50/50
See application file for complete search history.

(56) References Cited

U.S. PATENT DOCUMENTS

| | | | |
|---|---|---|---|
| 2010/0136427 A1 | 6/2010 | Kondo et al. | |
| 2012/0328930 A1 | 12/2012 | Inagaki et al. | |
| 2014/0057183 A1* | 2/2014 | Pratt | H01M 4/8652 429/405 |
| 2016/0099463 A1 | 4/2016 | Lee et al. | |
| 2016/0204433 A1 | 7/2016 | Takemoto et al. | |
| 2017/0077504 A1* | 3/2017 | Ise | H01M 4/366 |
| 2017/0107117 A1 | 4/2017 | Takemoto et al. | |
| 2017/0110725 A1 | 4/2017 | Sakamoto et al. | |
| 2017/0222272 A1 | 8/2017 | Takami et al. | |
| 2017/0271682 A1 | 9/2017 | Matsuno et al. | |
| 2017/0271717 A1 | 9/2017 | Yamashita et al. | |
| 2018/0083321 A1 | 3/2018 | Hotta et al. | |
| 2018/0277813 A1 | 9/2018 | Yoshima et al. | |
| 2018/0277899 A1 | 9/2018 | Takami et al. | |
| 2019/0088999 A1 | 3/2019 | Sekiguchi et al. | |
| 2019/0089011 A1 | 3/2019 | Seki et al. | |

FOREIGN PATENT DOCUMENTS

| | | |
|---|---|---|
| EP | 3 413 391 A1 | 12/2018 |
| JP | 09-508490 | 8/1997 |
| JP | 2000-077073 | 3/2000 |
| JP | 2003-017057 | 1/2003 |
| JP | 2005-071807 | 3/2005 |
| JP | 2016-006777 | 1/2016 |
| JP | 2016-076487 | 5/2016 |
| JP | 2017-174809 | 9/2017 |
| JP | 2017-174810 | 9/2017 |
| JP | 2018-045966 | 3/2018 |
| JP | 6321287 | 5/2018 |
| JP | 2018-160342 A | 10/2018 |
| JP | 2018-160443 A | 10/2018 |
| JP | 2019-57373 A | 4/2019 |
| JP | 2019-57388 A | 4/2019 |
| WO | WO 2009/008280 A1 | 1/2009 |
| WO | WO 2015/030192 A1 | 3/2015 |
| WO | WO 2015/151376 A1 | 10/2015 |
| WO | WO 2017/135323 A1 | 8/2017 |

\* cited by examiner

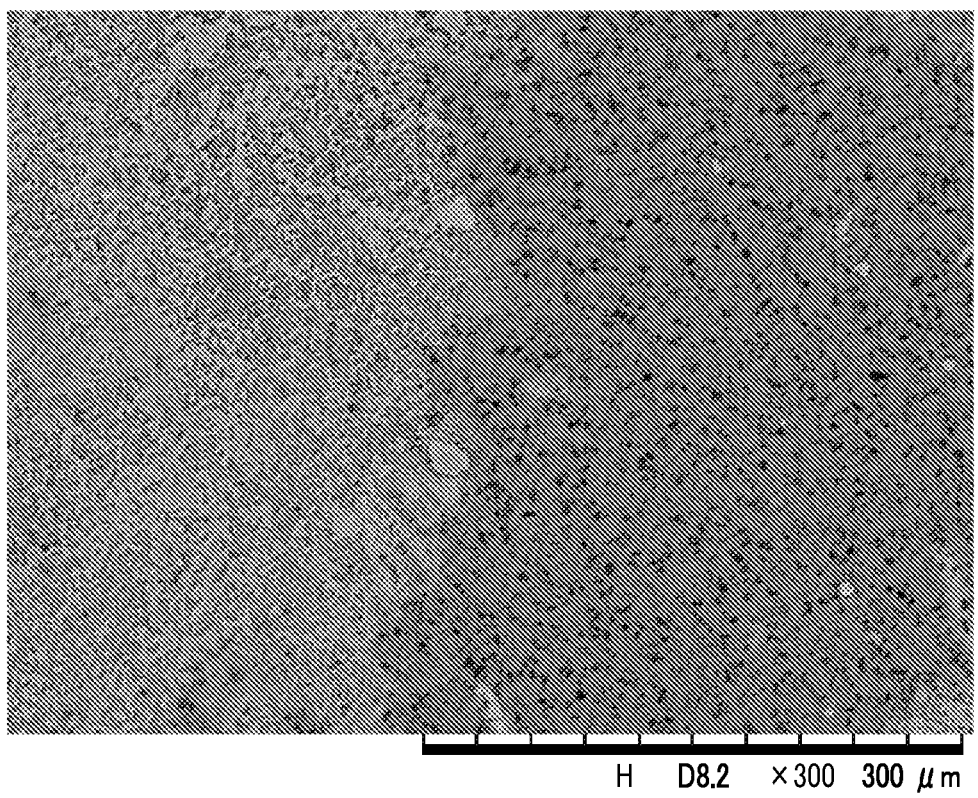
F I G. 1
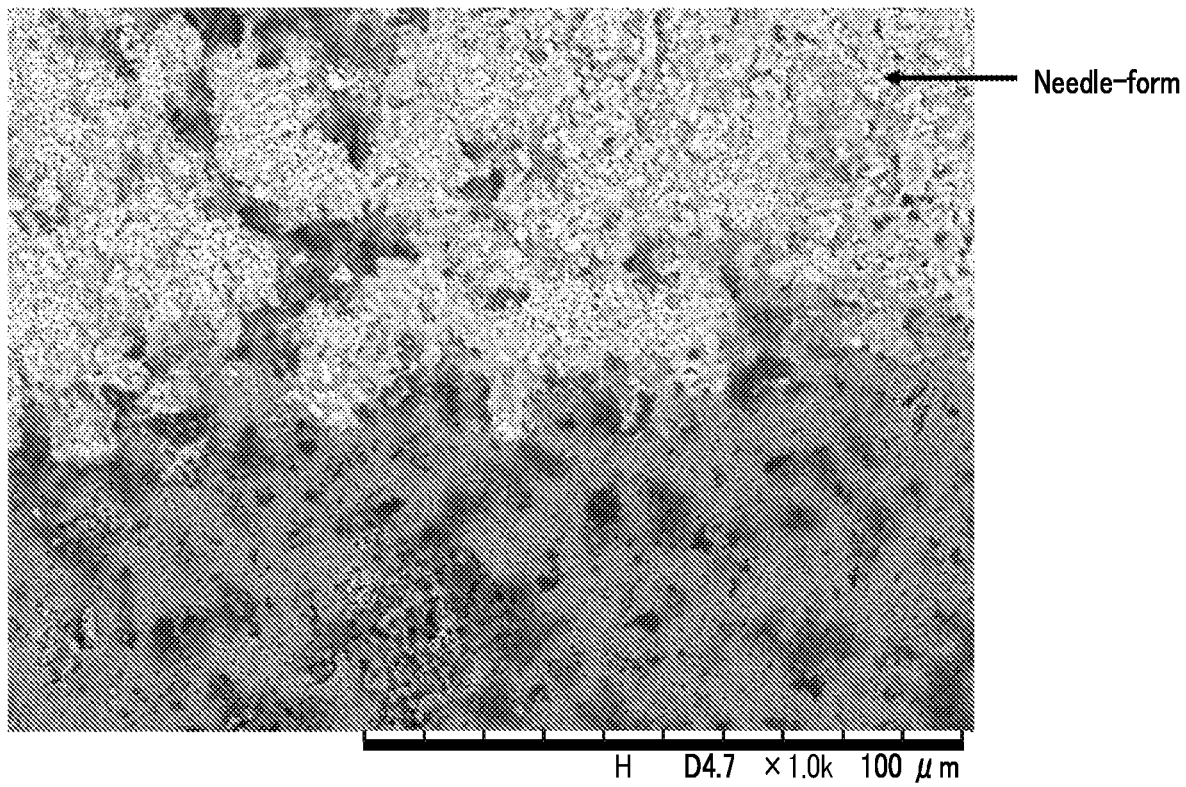
Needle-form
F I G. 2

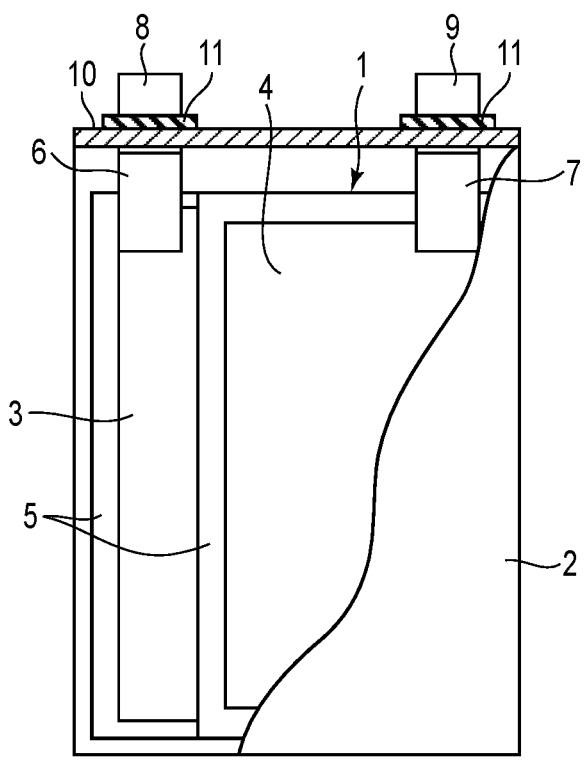
F I G. 3
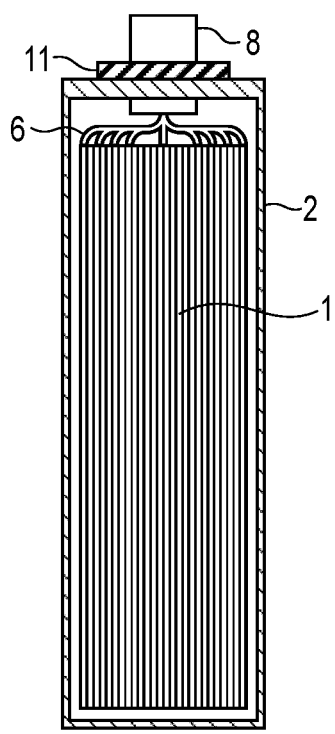
F I G. 4

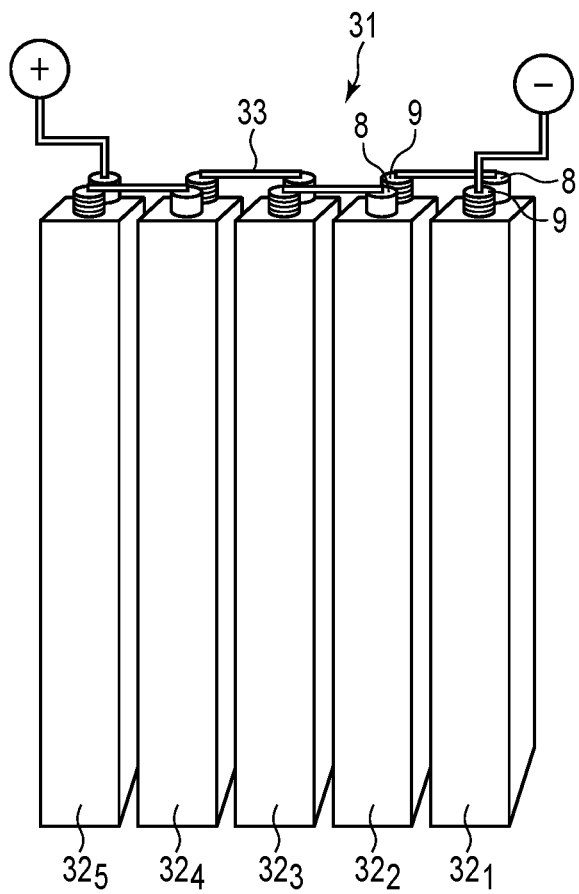
F I G. 7
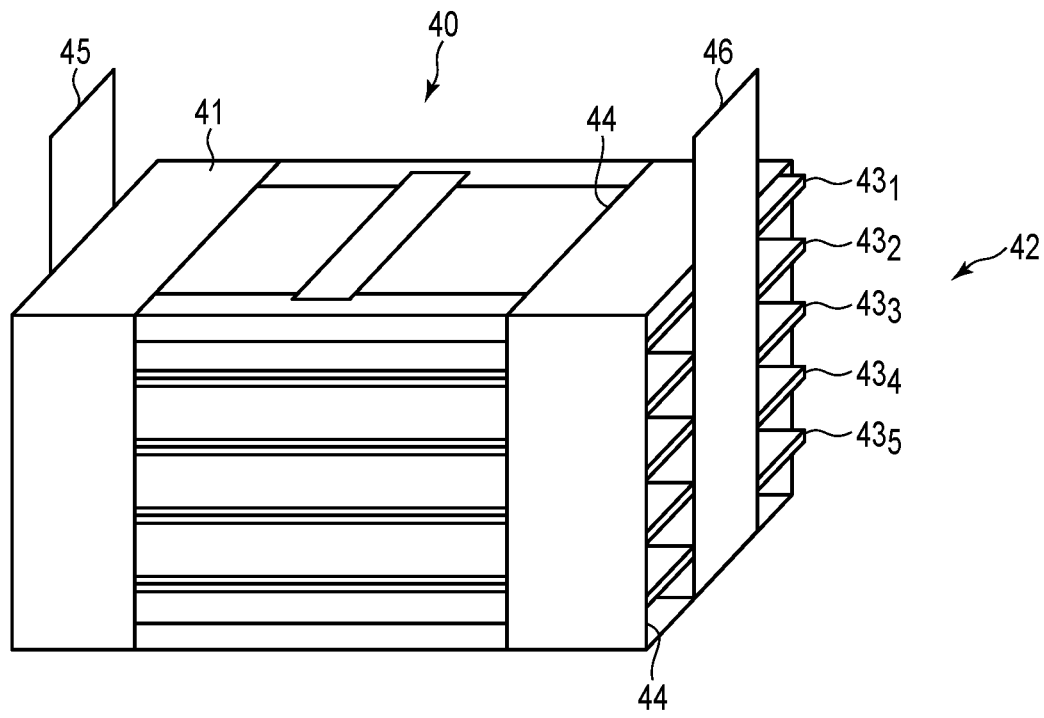
F I G. 8

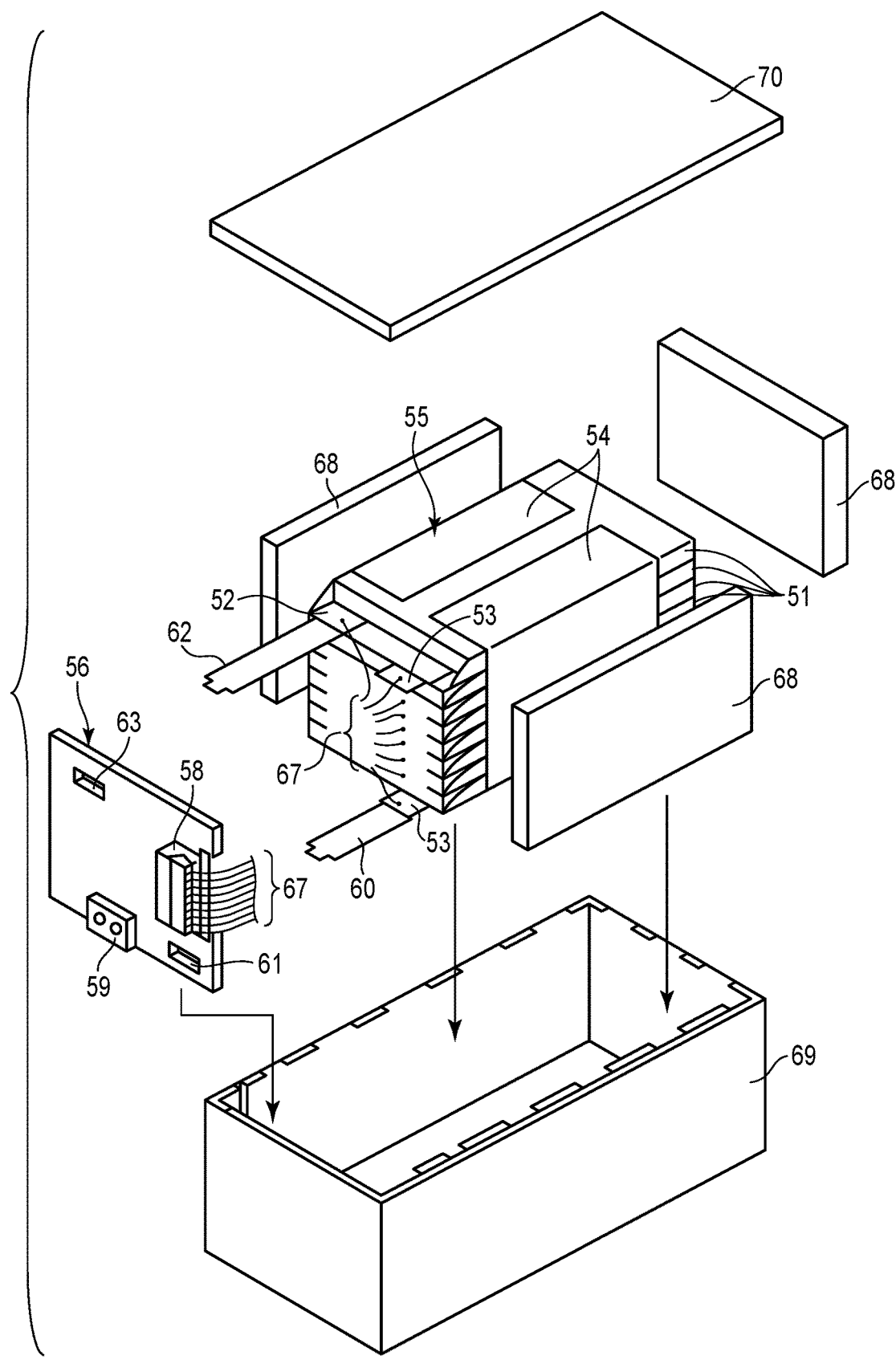
F I G. 9

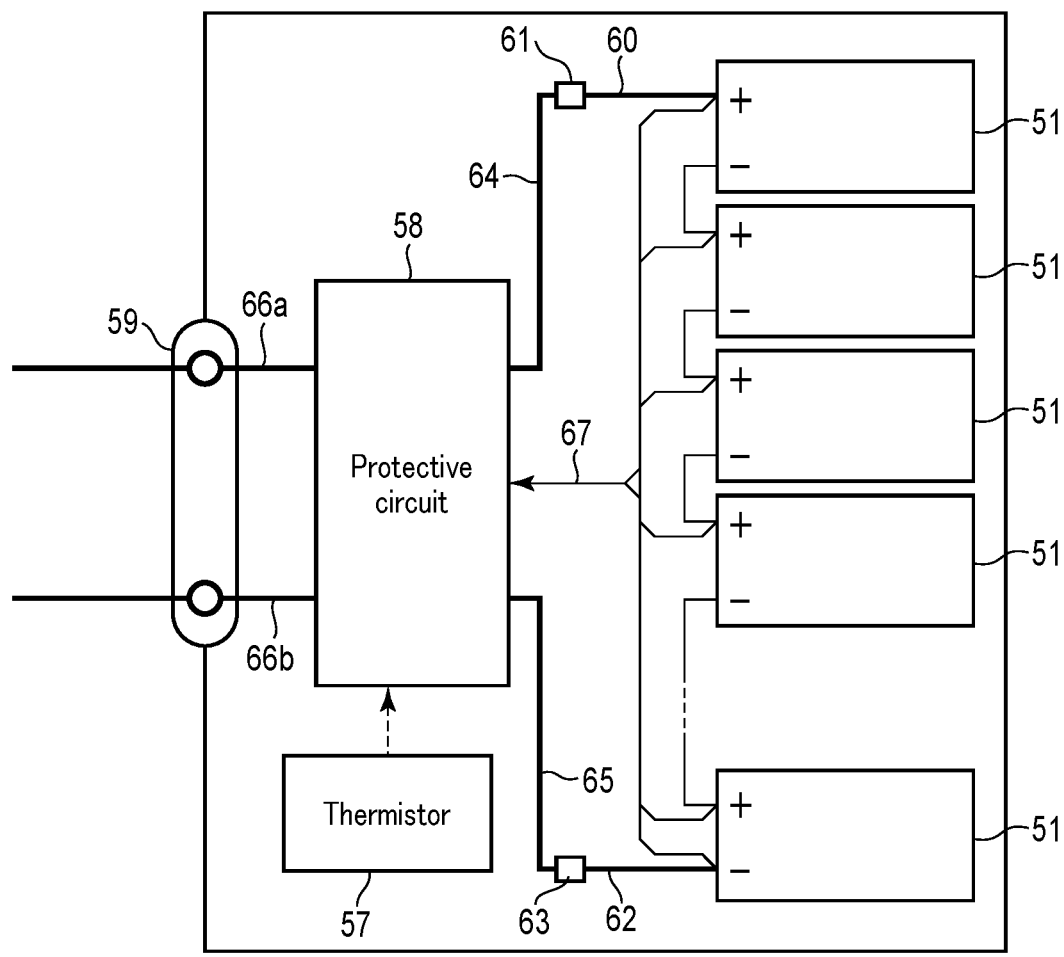
F I G. 10
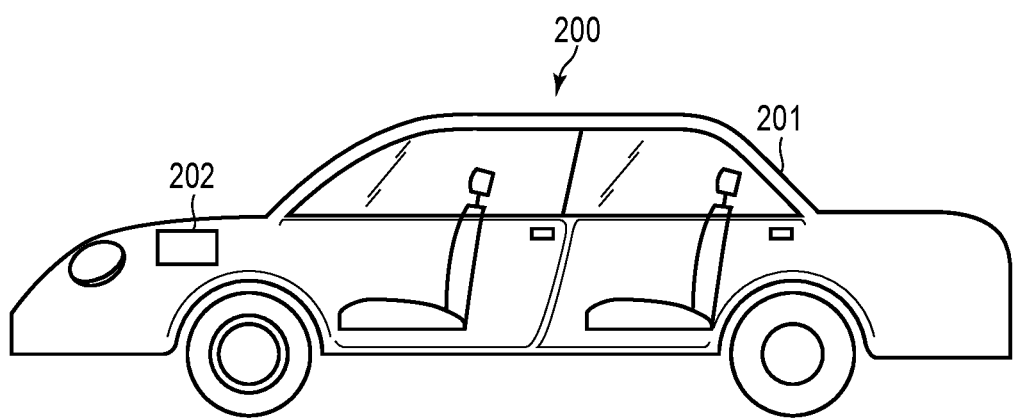
F I G. 11

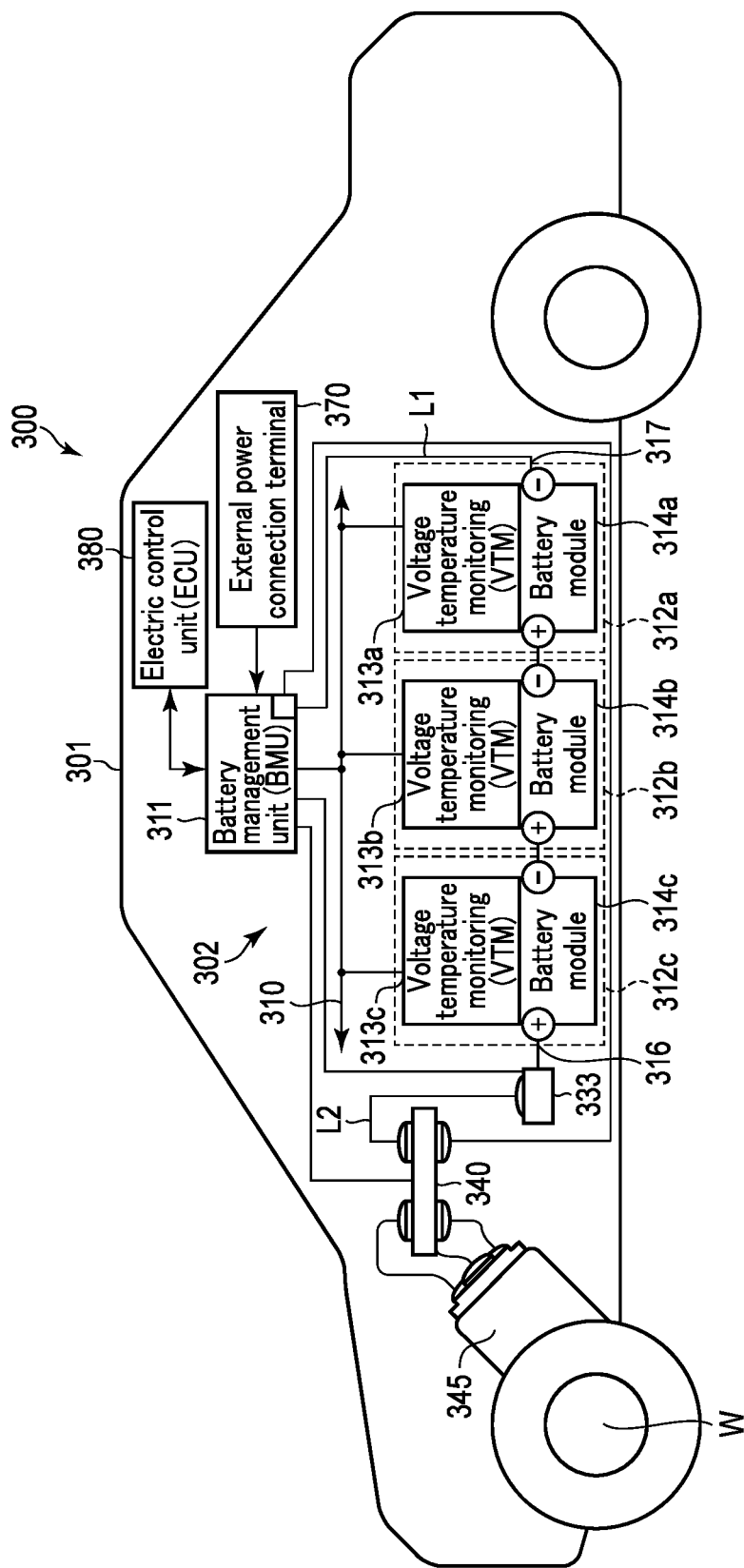
F I G. 12

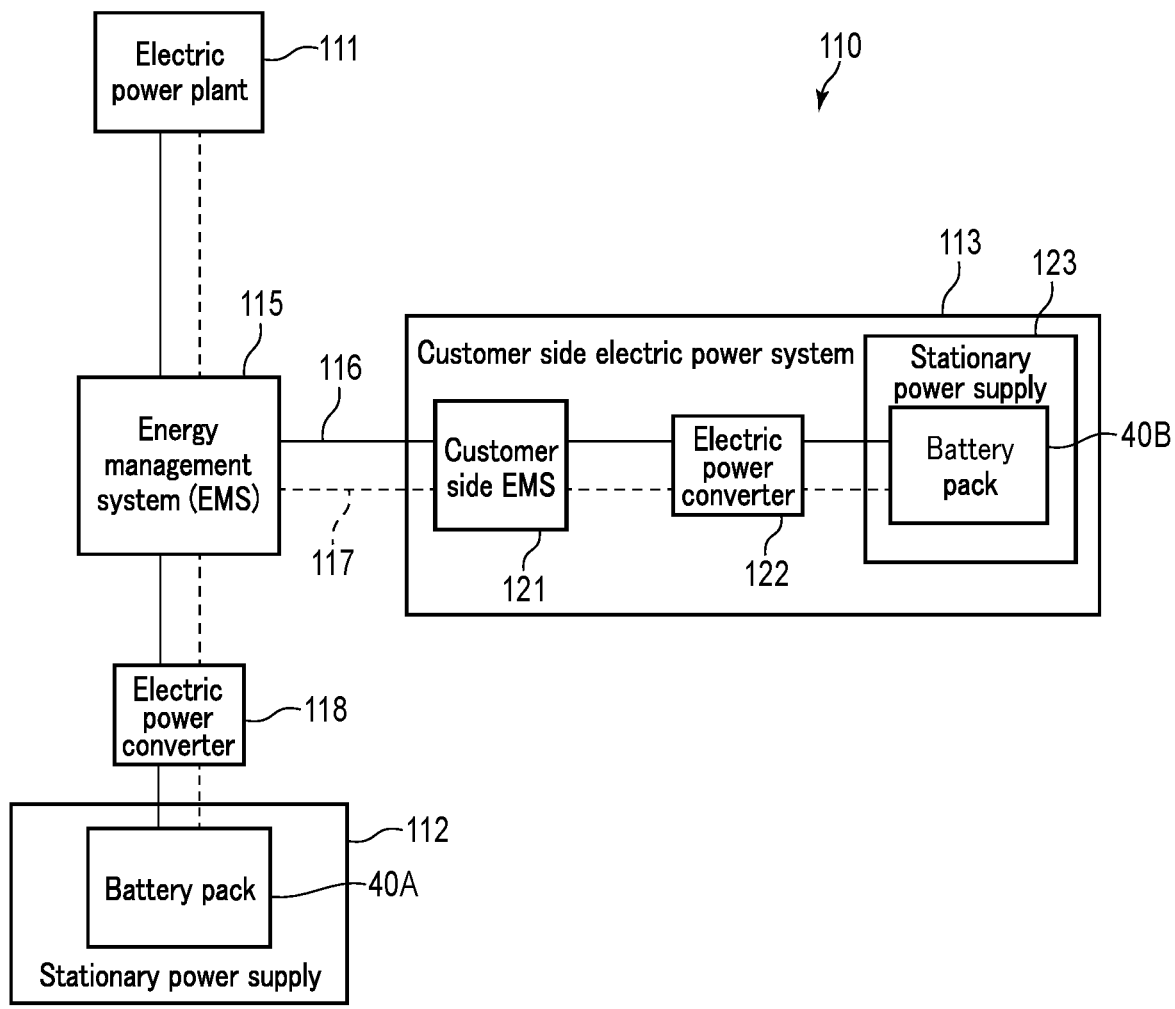
F I G. 13 ered to be sufficient. Furthermore, for the nonaqueous secondary battery, a dry environ-

SECONDARY BATTERY, BATTERY PACK, VEHICLE, AND STATIONARY POWER SUPPLY

CROSS-REFERENCE TO RELATED APPLICATION

This application is based upon and claims the benefit of priority from Japanese Patent Application No. 2018-54823, filed Mar. 22, 2018; and No. 2018-156595, filed Aug. 23, 2018; the entire contents of all of which are incorporated herein by reference.

FIELD

Embodiments described herein relate generally to a secondary battery, a battery pack, a vehicle, and a stationary power supply.

BACKGROUND

Nonaqueous electrolyte batteries, in which a carbon material or a lithium-titanium oxide is used as a negative electrode active material and a layered oxide including nickel, cobalt, manganese, and the like is used as a positive electrode active material, secondary batteries in particular, have already been put to practical use as a power source in a wide range of fields. Modes of such nonaqueous electrolyte batteries span over far ranges from small-sized batteries for various electronic devices to large-sized batteries for electric automobiles and the like. In an electrolyte for such secondary batteries, unlike a nickel-hydrogen battery or a lead storage battery, used is a nonaqueous organic solvent, in which ethylene carbonate, methyl ethyl carbonate, and the like are mixed. The electrolyte using such a solvent has oxidation resistance and reduction resistance that are higher than those of an aqueous electrolyte, and thus electrolysis of the solvent hardly occurs. For that reason, the nonaqueous secondary battery can realize a high electromotive force of from 2 V to 4.5 V.

On the other hand, many of the organic solvents are flammable materials, and thus the safety of the nonaqueous secondary battery is apt to be inferior to the secondary battery using an aqueous solution, in principle. Although various measures are being taken to improve the safety of the secondary battery using the electrolyte of organic solvent base, such measures are not necessarily sufficient. Furthermore, for the nonaqueous secondary battery, a dry environment is necessary in the production process, and thus the production cost is consequently increased. In addition, the electrolyte of organic solvent base has inferior electroconductivity, and thus the internal resistance of the nonaqueous secondary battery is apt to increase. These have been big issues in applications for an electric automobile and a hybrid electric automobile in which the battery safety and the battery cost are emphasized, and in an application for a large-sized storage battery for electricity storage. In order to solve the problems of the nonaqueous secondary battery, a secondary battery using an aqueous electrolyte has been proposed. However, the active material may easily become dislodged from the current collector due to the electrolysis of the aqueous electrolyte, and hence the operation of the secondary battery is not stable, which has been problematic in performing satisfactory charge and discharge.

BRIEF DESCRIPTION OF THE DRAWINGS

FIG. 1 is an SEM image of an example of a negative electrode surface in a first embodiment;

FIG. 2 is an SEM image of another example of a negative electrode surface in the first embodiment;

FIG. 3 is a partially cutout cross-sectional view schematically showing an example of a secondary battery according to the first embodiment;

FIG. 4 is a side view of the battery of FIG. 3;

FIG. 7 is a perspective view schematically showing an example of a battery module according to a second embodiment;

FIG. 8 is a perspective view schematically showing an example of a battery pack according to a third embodiment;

FIG. 9 is an exploded perspective view schematically showing another example of the battery pack according to the third embodiment;

FIG. 10 is a block diagram showing an electric circuit of the battery pack shown in FIG. 9;

FIG. 11 is a cross-sectional view schematically showing an example of a vehicle according to a fourth embodiment;

FIG. 12 is a diagram schematically showing another example of the vehicle according to the fourth embodiment; and FIG. 13 is a block diagram showing an example of a system including a stationary power supply according to a fifth embodiment.

DETAILED DESCRIPTION

Figure 5:
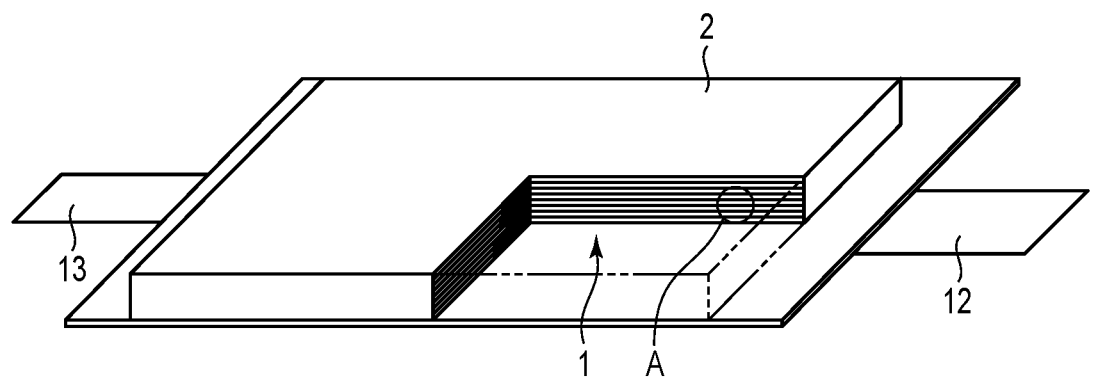
FIG. 5 is a partially cutout perspective view schematically showing another example of the secondary battery according to the first embodiment.

According to one embodiment, provided is a secondary battery including an aqueous electrolyte, a positive electrode, and a negative electrode, where the negative electrode includes a negative electrode active material containing a Ti-containing composite oxide. At least one element A selected from the group consisting of Hg, Pb, Zn, and Bi is present on a surface of the negative electrode. An average of molar ratios (A/(A+Ti)) of the element A is more than or equal to 5% and less than or equal to 40%. Each of the molar ratios is a molar amount of the element A to a sum between the molar amount of the element A and a molar amount of Ti on the surface of the negative electrode, according to scanning electron microscopy-energy dispersive X-ray spectroscopy.

According to another embodiment, a battery pack including the secondary battery according to the above embodiment is provided.

According to still another embodiment, a vehicle including the battery pack according to the above embodiment is provided.

According to still another embodiment, a stationary power supply including the battery pack according to the above embodiment is provided.

Hereinafter, embodiments will be described with reference to the drawings. Note that the same reference numerals are given to common configurations throughout the embodiments, and redundant descriptions are omitted. In addition, each drawing is a schematic view for describing the embodiment and facilitating the understanding thereof, and there are some differences in shape, dimension, ratio, and the like from an actual device. These, however, may be changed as appropriate, considering the following description and known technology.

First Embodiment

In order to solve the issues of nonaqueous secondary batteries, conversion of the electrolyte to an aqueous solution has been considered. In an aqueous solution electrolyte, a potential range of performing charging and discharging of the battery is required to be limited within a potential range where an electrolysis reaction of water, included as a solvent, does not occur. For example, when a lithium manganese oxide is used as a positive electrode active material and a lithium vanadium oxide is used as a negative electrode active material, electrolysis of the aqueous solvent can be avoided. According to this combination, however, though an electromotive force of about 1 V to 1.5 V can be obtained, it is difficult to obtain an energy density sufficient for a battery.

When a lithium manganese oxide is used as the positive electrode active material and a lithium titanium oxide such as $LiTi_2O_4$ or $Li_4Ti_5O_{12}$ is used as the negative electrode active material, an electromotive force of about 2.6 V to 2.7 V can be theoretically obtained, and thus the battery can be expected to be attractive in terms of the energy density. In a nonaqueous lithium ion battery employing such a combination of the positive and negative electrode materials, excellent life performance can be obtained, and such a battery has already been put into practical use. In an aqueous solution electrolyte, however, since a potential of lithium insertion and extraction for the lithium titanium oxide is about 1.5 V (vs. $Li/Li^+$) relative to a lithium reference potential, electrolysis of the aqueous solution electrolyte is apt to occur. In particular, at the negative electrode, hydrogen is vigorously generated by electrolysis occurring on a surface of a negative electrode current collector or a metal outer can electrically connected to the negative electrode, and thus the active material may become easily flaked off from the current collector due to the influence of the hydrogen generation. As a result, such a battery does not function stably and sufficient charge and discharge cannot be performed.

In the prior art, it had been possible to provide a lithium secondary battery containing zinc in a current collector so as to have a sufficient energy density, be excellent in charge-discharge efficiency and lifetime performance, and be inexpensive and highly safe, but there has been room for improvement in terms of charge-discharge efficiency and storage performance.

As a result of earnest studies to solve this problem, the inventors arrived at a secondary battery according to the first embodiment.

The secondary battery according to the first embodiment is provided with an aqueous electrolyte, a positive electrode, and a negative electrode. The negative electrode includes a negative electrode active material containing a Ti-containing composite oxide. At least one element A selected from the group consisting of Hg, Pb, Zn, and Bi is present on a surface of the negative electrode. An average of molar ratios (A/(A+Ti)) of the element A is more than or equal to 5% and less than or equal to 40%. Each of the molar ratios is a molar amount of the element A to a sum between the molar amount of the element A and a molar amount of Ti. The molar ratios are obtained by plural measurements of the surface of the negative electrode by scanning electron microscopy-energy dispersive X-ray spectroscopy (SEM-EDS).

The negative electrode includes a current collector and a negative electrode active material layer. The negative electrode active material layer contains a negative electrode active material and is disposed on the current collector. The negative electrode active material layer contains a negative electrode active material containing a Ti-containing composite oxide. An element A is present as a compound containing the element A on the surface of the negative electrode. The compound containing the element A indicates a formation of at least one of a sole metal, an oxide, a chloride, a nitrate, a sulfate, and hydroxide of the element A, which has precipitated on the negative electrode surface. Here, the sole metal is also referred to as a compound for the sake of convenience. The compound containing the element A is present on the surfaces of an electro-conductive agent and binder for the negative electrode and surface of the negative electrode active material, which are exposed on the surface of the negative electrode active material layer on the side opposite to the current collector. At this time, the compound containing the element A is present physically. The compound containing the element A has a small exchange current density and a high hydrogen generation overvoltage. Therefore, the hydrogen generation can be suppressed in the negative electrode.

FIG. 1 is a scanning electron microscopy (SEM) image obtained by measuring the surface of an example of the negative electrode in the first embodiment at 300 times magnification, and FIG. 2 is a SEM image obtained by measuring the surface of another example of the negative electrode in the first embodiment at 1000 times magnification. The compound containing the element A is partially present on the surface of the negative electrode, as can be seen, where the compound containing the element A present on the surface of the negative electrode is shown in white and the surface of the negative electrode is shown in black in FIG. 1. By being partially present, the compound containing the element A can be increased in its abundance without completely covering the surface of the negative electrode. It is thus possible to suppress the hydrogen generation in the negative electrode while suppressing the electrical resistance caused by the presence of the compound containing the element A on the negative electrode surface. Further, as shown in FIG. 2, the compound containing the element A may be present in a needle form, depending on the species of the element A and treatment conditions. When the compound containing the element A is present in the needle form, similarly to the above, the surface of the negative electrode has a portion where the compound containing the element A is present and a portion where the compound containing the element A is not present. Therefore, a molar ratio of the element A to the total of the element A and Ti on the surface of the negative electrode of the secondary battery according to the present embodiment is from 5% or greater to 40% or less.

As thus described, the inclusion of the region where the molar ratio of the element A to the total of the element A and Ti on the surface of the negative electrode is from 5% to 40% enables suppression of the hydrogen generation from the negative electrode, and it is thus possible to improve the binding property between the current collector and the active material and increase paths for electronic conduction. Thereby, improvement in cycle performance and reduction in the electrical resistance can be achieved. Hence, it is possible to improve charge-discharge efficiency and storage performance.

Further, it is also considered that, when the compound containing the element A is present in the needle form, even concerning the portion where the compound is present in the needle form, there can be a section where the negative electrode and the electrolyte can be in contact. Therefore, making the compound which contains the element A present in the needle form makes it more possible to improve the cycle performance and reduce the electrical resistance. Hence, it is possible to improve charge-discharge efficiency and storage performance.

It is more preferable to include a region where the molar ratio of the element A is more than or equal to 10% and less than or equal to 20%. This is because in addition to the improvement of adhesion among the negative electrode active material, the binder, and the electro-conductive agent, which enables suppression of dislodging of the negative electrode from the current collector, the following applies. The electrical resistance becomes uniform in the electrode when including such a region, making it possible to prevent local heat generation, local deterioration accompanied thereby, and the like, and thus, the cycle performance can be improved further. Further, the presence of the compound containing the element A on the negative electrode active material, the electro-conductive agent, and the current collector in the above range enables reduction in the contact between the negative electrode active material and the electrolyte, which causes hydrogen generation. Hence, it is possible to improve the charge-discharge efficiency and the storage performance. In the above range, the compound containing the element A can be present without inhibiting conduction of lithium or sodium, and thus, rate performance can be improved.

It is not preferable that the molar ratio (A/(A+Ti)) does not fall within the range of from 5% or more to 40% or less, for the following reasons. With the molar ratio below 5%, the storage performance is not improved because the hydrogen generation from the negative electrode cannot be suppressed. With the molar ratio over 40%, insertion and removal of lithium is inhibited due to the coating by the compound containing the element A, causing an increase in electrical resistance and deterioration in rate performance.

Although the description has been given of the presence of the compound containing the element A on the surface of the negative electrode, the compound containing the element A may also be made present on the surfaces of negative electrode active material, the electro-conductive agent, and the binder that are inside the negative electrode. Because the compound containing the element A may also be made present inside, it is possible to suppress the hydrogen generation from the inside of the electrode. It is thus possible to prevent reduction in number of electro-conductive paths caused by detachment of the active material or cracking of the electrodes due to the hydrogen generation, and is therefore possible to improve the cycle performance.

The compound containing the element A can be formed, for example, by precipitation onto the surface of the negative electrode at the time of production. Further, regarding the state of the presence of the compound containing the element A on the surface of the negative electrode and the abundance thereof on the surface, primarily important are a charging rate at the time of the initial charge, the composition of the electrolyte, and the number of charge-discharge cycles. In addition, an amount of metal contained in the electrolyte is also important, and the concentration of the element A in the electrolyte is also an important parameter in performing metal coating. When the element A is not added into the electrolyte and, for example, the compound containing the element A is used as the current collector, the amount of the element A in the electrolyte can be controlled by regulating the time from the assembly of the battery to the initial charge and discharge.

Here, a flow in which the compound containing element A is precipitated on the surface will be described.

A secondary battery containing the element A in the negative electrode current collector is assembled. At this time, the element A is eluted into the electrolyte. By controlling the time until performing the initial charge and discharge of the assembled secondary battery, the element A eluted in the electrolyte precipitates on the surface of the negative electrode active material and the like during the charge reaction. The precipitated element A forms a compound containing the element A by the charge reaction, and the compound precipitates on the surface of the negative electrode. In the secondary battery according to the present embodiment, the standby time is set long and the initial charge-discharge rate is set high, thereby enabling precipitation of the compound containing the element A on the surface of the negative electrode. Also in the case where the element A is put into the electrolyte, it is possible to form the compound containing the element A by the charge reaction in a similar manner, and precipitate the formed compound on the surface of the negative electrode. As a simple method, for example, addition of a surfactant into the electrolyte can be mentioned. Addition of the surfactant enables the surface shape control and the film property control. In the surface shape control, the precipitation reaction of the compound containing the element A can be promoted due to the promoting action by deposition of the surfactant onto the plating surface or by electric consumption. The hardness and electric conductivity of the plating film can be changed by the film property control. The surfactant will be described later.

In the secondary battery according to the present embodiment, by containing the element A therein, the compound containing the element A can be made present on the surface of the negative electrode, so that it is possible to suppress displacement of the negative electrode active material off the negative electrode current collector. Further, the compound containing the element A does not cover the whole surface of the negative electrode, so that it is possible to suppress the electrical resistance caused by the presence of the compound containing the element A. As a result, even at a potential in the vicinity of 1.5 V (vs. Li/Li$^+$) with a lithium potential as a reference, it is possible to charge and discharge oxides of titanium, lithium titanium oxides, and lithium titanium composite oxides in the aqueous solvent. Note that, although discussion has been made regarding lithium, sodium may be used in place of lithium. The element A can be contained in, for example, the current collector, the electrolyte, and the negative electrode in the secondary battery.

Here, a method for measuring the molar ratio of the element A to the sum between the element A and Ti will be described.

First, the secondary battery is disassembled. For example, after the secondary battery, having undergone the initial charge, is discharged, this battery is disassembled and the negative electrode is taken out. The negative electrode having been taken out is washed with pure water for 30 minutes, and then vacuum-dried for 24 hours in an environment at a temperature of 80° C. After drying, the temperature is returned to 25° C. and the negative electrode is taken out.

In the negative electrode taken out in this way, EDS measurement is conducted randomly at ten locations with a field of view of 4 mm×4 mm to derive the molar ratio (A/(A+Ti)) of the element A to the sum between the element A and Ti. At the time of measurement, the molar ratio of the element A is obtained from an EDS peak intensity ratio and an area ratio for each location. Then, the field of view having the lowest molar ratio of the element A out of the ten locations is further divided into 400 frames each having a field of view of 0.2 mm×0.2 mm. In each of the fields of view of the 400 frames, the EDS measurement is further conducted using the peak described above. From the average of molar ratios of the element A in the remaining 60% of fields of view disregarding a higher 20% of the molar ratio of the element A and a lower 20%, the molar ratio of the element A to the total of the element A and Ti can be calculated. It is assumed that this molar ratio is the molar ratio (A/(A+Ti)) of the element A to the sum of the element A and Ti in the negative electrode examined.

A difference is preferably 3% or more, between a maximum value and a minimum value among the molar ratios (A/(A+Ti)) measured after dividing into 400 fields of view. This is because, a presence of the element A that is greater by at least 3% relative to the minimum value indicates that the element A is sufficiently present on a majority of the electrode area, and therefore, there is great improvement in terms of the self-discharge rate.

A larger molar ratio of the element A indicates that there is more of the element A present on the surface of the negative electrode. Hence, the molar ratio can be replaced with the abundance of the compound containing the element A on the surface of the negative electrode.

Although the presence of the compound containing the element A on the surface of the negative electrode has been described so far, the compound containing the element A can be present also on the negative electrode current collector. Details will be described later.

Materials for the respective members usable in the secondary battery according to the first embodiment will be described in detail.

1) Negative Electrode

The negative electrode includes a negative electrode current collector, and a negative electrode active material layer disposed on the negative electrode current collector. The negative electrode active material layer is disposed on at least one surface of the negative electrode current collector. For example, the negative electrode active material layer may be disposed on one surface of the negative electrode current collector, or negative electrode active material layers may be disposed on one surface of the negative electrode current collector and on a surface on the reverse side.

The negative electrode active material layer includes a negative electrode active material including at least one compound selected from the group consisting of an oxide of titanium, a lithium titanium oxide, and a lithium titanium composite oxide. The oxides may be used alone or as a mixture of several oxides. In the oxides, Li insertion and extraction reaction occurs within a range of 1 V to 2 V (vs. $Li/Li^+$) relative to a lithium reference potential. For that reason, when the oxides described above are used as the negative electrode active material of the lithium secondary battery, the change in volume due to expansion and contraction, which accompany charge and discharge, is small, and thus long operation life can be realized.

It is preferable that at least one element selected from the group consisting of Zn, Ga, In, Bi, Tl, Sn, Pb, Ti and Al, is included in the current collector. These elements may be used alone or as a mixture of multiple elements, and may be included in the state of a metal or metal alloy. The metal and metal alloy may be included alone or as a mixture of two or more. When such an element is included in the current collector, the mechanical strength of the current collector is increased and thus the processing thereof is improved. Further, the effect of suppressing the electrolysis of the aqueous solvent to thereby suppress the hydrogen generation is increased. Of the elements described above, Zn, Pb, Ti and Al are more preferable.

The current collector is, for example, a metal foil made of these metals. Further, the current collector is, for example, a foil made of an alloy containing these metals. Such a foil may contain, for example, one or more elements described below, in addition to the element A. Besides the foil, examples of the shape of the metal article or alloy article as the current collector include a mesh and a porous structure. For improving the energy density and output, the shape of the foil having a small volume and a large surface area is desired.

Further, the negative electrode current collector may include a substrate containing a metal different from the element A. In such a case, the hydrogen generation can be suppressed by the presence of the compound containing the element A on at least a part of the surface of the substrate. The compound containing the element A present on the surface is desirably disposed so as to be in contact with the negative electrode active material layer. For example, the element A can be made present on the surface of the substrate by plating the element A on the substrate. Alternatively, it is possible to perform plating treatment using an alloy containing element A on the surface of the substrate.

The current collector may include at least one compound selected from the group consisting of an oxide of element A, a hydroxide of element A, a basic carbonate compound of element A, and a sulfate compound of element A. The oxide of element A and/or the hydroxide of element A and/or the basic carbonate compound of element A, and/or the sulfate compound of element A are preferably included in at least a part of the surface region of the current collector, within a depth region of from 5 nm or greater to 1 µm or less in the depth direction from the current collector surface. An example of the oxide of element A includes ZnO, an example of the hydroxide of element A includes $Zn(OH)_2$, an example of the basic carbonate compound of element A includes $2ZnCO_3 \cdot 3Zn(OH)_2$, and an example of the sulfate compound of element A includes $ZnSO_4 \cdot 7H_2O$, and the like.

When at least one of an oxide of the element A, a hydroxide of the element A, a basic carbonate compound of the element A, and a sulfate compound of the element A is present in the surface layer portion of the current collector, hydrogen generation can be suppressed. In addition, when these compounds are present in the surface layer portion of the current collector, the adhesion between the current collector and the active material is improved, enabling an increase in paths for electronic conduction. Therefore, it is possible to improve the cycle performance and reduce the electrical resistance.

The substrate preferably includes at least one metal selected from the group consisting of Al, Fe, Cu, Ni, and Ti. The metals may be included in the state of an alloy. The substrate may include the metal or metal alloy alone or as a mixture of two or more. The substrate preferably includes Al, Ti, or an alloy thereof, from the perspective of weight reduction.

Whether or not at least one compound selected from the group consisting of the oxide of element A, the hydroxide of element A, the basic carbonate compound of element A, and the sulfate compound of element A is contained in the current collector, can be examined by disassembling the battery as described above and then conducting, for example, inductively coupled plasma (ICP) emission spectrometry.

The negative electrode active material includes one compound, or two or more compounds selected from the group consisting of an oxide of titanium, lithium titanium oxide, and lithium titanium composite oxide. Examples of the lithium titanium composite oxide include a niobium titanium oxide and a sodium niobium titanium oxide. The compounds desirably have a Li insertion potential in a range of 1 V (vs. Li/Li$^+$)) to 3 V (vs. Li/Li$^+$).

Examples of the oxide of titanium include an oxide of titanium having a monoclinic structure, an oxide of titanium having a rutile structure, and an oxide of titanium having an anatase structure. For the oxide of titanium having each crystal structure, the composition before charging can be represented by TiO$_2$, and the composition after charging can be represented by Li$_x$TiO$_2$, wherein x is 0≤x≤1. The structure before charging for the oxide of titanium having the monoclinic structure can be represented by TiO$_2$(B).

Examples of the lithium titanium oxide include a lithium titanium oxide having a spinel structure (for example, the general formula: Li$_{4+x}$Ti$_5$O$_{12}$ wherein x is −1≤x≤3), a lithium titanium oxide having a ramsdellite structure (for example, Li$_{2+x}$Ti$_3$O$_7$ wherein −1≤x≤3), Li$_{1+x}$Ti$_2$O$_4$ wherein 0≤x≤1, Li$_{1.1+x}$Ti$_{1.8}$O$_4$ wherein 0≤x≤1, Li$_{1.07+x}$Ti$_{1.86}$O$_4$ wherein 0≤x≤1, and Li$_x$TiO$_2$ wherein 0<x≤1), and the like. The lithium titanium oxide includes, for example, a lithium titanium composite oxide in which a dopant is introduced into the above lithium titanium oxide having the spinel structure or the ramsdellite structure.

Examples of the niobium titanium oxide include oxides represented by Li$_a$TiM$_b$Nb$_{2±β}$O$_{7±σ}$ wherein 0≤a≤5, 0≤b≤0.3, 0≤β≤0.3, 0≤σ≤0.3, and M includes at least one selected from the group consisting of Fe, V, Mo, and Ta.

Examples of the sodium niobium titanium oxide include an orthorhombic Na-containing niobium titanium composite oxide represented by the general formula Li$_{2+v}$Na$_{2-w}$M1$_x$Ti$_{6-y-z}$Nb$_y$M2$_z$O$_{14+δ}$ wherein 0≤v≤4, 0<w<2, 0≤x<2, 0<y<6, 0≤z<3, y+z<6, −0.5≤δ≤0.5, M1 includes at least one selected from the group consisting of Cs, K, Sr, Ba, and Ca, and M2 includes at least one selected from the group consisting of Zr, Sn, V, Ta, Mo, W, Fe, Co, Mn, and Al.

Preferable compounds for the negative electrode active material may include the oxide of titanium having an anatase structure, the oxide of titanium having a monoclinic structure, and the lithium titanium oxide having the spinel structure. Each compound has a Li insertion potential of from 1.4 V (vs. Li/Li$^+$) to 2 V (vs. Li/Li$^+$), and thus, when combined with a lithium manganese oxide as the positive electrode active material, for example, a high electromotive force can be obtained. Especially, the lithium titanium oxide having the spinel structure is more preferable because the change in volume due to the charge-discharge reaction is very small.

The negative electrode active material may be included in the negative electrode active material layer in the form of particles. The negative electrode active material particle may be singular primary particles, secondary particles in which each of the secondary particles include aggregated primary particles, or a mixture of singular primary particles and secondary particles. The shape of the particles is not particularly limited and, for example, may be a spherical shape, an elliptic shape, a flat shape, a fiber shape, or the like.

It is preferable that an average particle size (a diameter) of the secondary particles of the negative electrode active material is 3 μm or more, more preferably from 5 μm to 20 μm. When the size is within this range, the surface area of the active material is small, and thus the effect of suppressing the hydrogen generation can be increased.

The negative electrode active material having the secondary particles whose average particle size is 3 μm or more can be obtained, for example, by the following method. First, starting materials for the active material are subjected to synthetic reaction to produce an active material precursor having an average particle size of 1 μm or less. After that, the active material precursor is subjected to a firing treatment, followed by a pulverization treatment using a pulverizer such as a ball mill or a jet mill. Next, by a firing treatment, the active material precursors are aggregated and grown into secondary particles having a large particle size.

The primary particles in the negative electrode active material desirably have an average particle size of 1 μm or less. This way, a diffusion length of Li ions within the active material is shortened, and a specific surface area becomes larger. Therefore, high input performance (rapid charging performance) can be obtained. On the other hand, when the average particle size is small, the particles become easily aggregated, whereby the distribution of the electrolyte becomes inclined toward the negative electrode, and the electrolyte may consequently be exhausted at the positive electrode. For that reason, the lower limit of the average primary particle size is desirably 0.001 μm. The average particle size is more preferably from 0.1 μm to 0.8 μm.

The negative electrode active material particles desirably have a specific surface area of from 3 m$^2$/g to 200 m$^2$/g, as determined by a BET method employing N$_2$ deposition. By having such a specific surface area, the affinity between the negative electrode and the electrolyte can be further enhanced.

The negative electrode active material layer (excluding the current collector) desirably has a specific surface area of from 3 m$^2$/g to 50 m$^2$/g. The specific surface area is more preferably from 5 m$^2$/g to 50 m$^2$/g. The negative electrode active material layer may be a porous layer including the negative electrode active material, the electro-conductive agent, and the binder, where the layer is supported on the current collector.

The porosity of the negative electrode (excluding the current collector) is desirably in a range of 20% to 50%, whereby a negative electrode having excellent affinity between the negative electrode and the electrolyte and high density can be obtained. The porosity is more preferably in a range of 25% to 40%.

The electro-conductive agent may include carbon materials such as acetylene black, carbon black, coke, carbon fiber, and graphite, and powders of a metal such as nickel or zinc. The electro-conductive agent may be used alone or as a mixture of two or more agents. It is desirable to use the metal powder as the electro-conductive agent, because hydrogen is generated from the carbon material itself.

The binder may include, for example, polytetrafluoroethylene (PTFE), polyvinylidene fluoride (PVdF), fluororubber, ethylene-butadiene rubber, polypropylene (PP), polyethylene (PE), carboxymethyl cellulose (CMC), polyimide (PI), polyacrylimide (PAI), and the like. The binder may be used alone or as a mixture of two or more binders.

With respect to the mixing ratio of the negative electrode active material, the electro-conductive agent, and the binder in the negative electrode active material layer, it is preferable that the negative electrode active material is included in a range of 70% by weight to 95% by weight, the electro-conductive agent is included in a range of 3% by weight to 20% by weight, and the binder is included in a range of 2% by weight to 10% by weight. When the mixing ratio of the electro-conductive agent is 3% by weight or more, the electro-conductivity of the negative electrode can be made good, and when the mixing ratio is 20% by weight or less, the degradation of the electrolyte on the surface of the electro-conductive agent can be reduced. When the mixing ratio of the binder is 2% by weight or more, sufficient electrode strength can be obtained, and when the mixing ratio is 10% by weight or less, the insulating portions within the electrode can be reduced.

The negative electrode can be produced, for example, by the following method. First, the negative electrode active material, the electro-conductive agent, and the binder are dispersed in an appropriate solvent to prepare a slurry. The resulting slurry is coated onto the current collector, and the coat of applied slurry is dried to form the negative electrode active material layer on the current collector. Here, for example, the slurry may be coated on one side of the current collector, or may be coated on one surface of the current collector and a surface on the reverse side. Then, the current collector and the negative electrode active material layer are subjected to pressing, for example, heat pressing, whereby the negative electrode can be produced.

2) Positive Electrode

The positive electrode may include a positive electrode current collector, and a positive electrode active material layer supported on one surface or both of reverse surfaces of the positive electrode current collector, where the positive electrode active material layer includes an active material, an electro-conductive agent, and a binder.

It is preferable to use a foil, porous structure, or mesh made of a metal such as stainless steel, Al, or Ti as the positive electrode current collector. In order to prevent corrosion of the current collector caused by the reaction of the current collector with the electrolyte, the surface of the current collector may be covered with another element.

As the positive electrode active material, there may be used a material capable of having lithium and sodium be inserted and extracted. The positive electrode may include one kind of positive electrode active material, or include two or more kinds of positive electrode active materials. Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a lithium fluorinated iron sulfate, a phosphate compound having an olivine crystal structure (for example, $Li_xFePO_4$ wherein $0 \leq x \leq 1$, or $Li_xMnPO_4$ wherein $0 \leq x \leq 1$), and the like. The phosphate compound having an olivine crystal structure has excellent thermal stability.

Examples of the positive electrode active material with which a high positive electrode potential can be obtained are described below. Examples include lithium manganese composite oxides such as $Li_xMn_2O_4$ having a spinel structure wherein $0<x \leq 1$, or $Li_xMnO_2$ wherein $0<x \leq 1$; a lithium nickel aluminum composite oxide such as $Li_xNi_{1-y}Al_yO_2$ wherein $0<x \leq 1$ and $0<y \leq 1$; lithium cobalt composite oxides such as $Li_xCoO_2$ wherein $0<x \leq 1$; lithium nickel cobalt composite oxides such as $Li_xNi_{1-y-z}Co_yMn_zO_2$ wherein $0<x \leq 1$, $0<y \leq 1$, and $0 \leq z \leq 1$; lithium manganese cobalt composite oxides such as $Li_xMn_yCo_{1-y}O_2$ wherein $0<x \leq 1$ and $0<y \leq 1$; spinel type lithium manganese nickel composite oxides such as $Li_xMn_{2-y}Ni_yO_4$ wherein $0<x \leq 1$ and $0<y<2$; lithium phosphates having an olivine structure such as $Li_xFePO_4$ wherein $0<x \leq 1$, $Li_xFe_{1-y}Mn_yPO_4$ wherein $0<x \leq 1$ and $0 \leq y \leq 1$, or $Li_xCoPO_4$ wherein $0<x \leq 1$; fluorinated iron sulfates such as $Li_xFeSO_4F$ wherein $0<x \leq 1$, and the like.

Further examples of the positive electrode active material include sodium manganese composite oxide, sodium nickel composite oxide, sodium cobalt composite oxide, sodium nickel cobalt manganese composite oxide, sodium iron composite oxide, sodium phosphate compounds (for example, sodium iron phosphate and sodium vanadium phosphate), sodium iron manganese composite oxide, sodium nickel titanium composite oxide, sodium nickel iron composite oxide, and sodium nickel manganese composite oxide.

Examples of a preferable positive electrode active material include iron composite oxides (for example, $Na_yFeO_2$, wherein $0 \leq y \leq 1$), iron manganese composite oxides (for example, $Na_yFe_{1-x}Mn_xO_2$, wherein $0<x<1$, $0 \leq y \leq 1$), nickel titanium composite oxide (for example, $Na_yNi_{1-x}Ti_xO_2$, wherein $0<x<1$, $0 \leq y \leq 1$), a nickel iron composite oxide (for example, $Na_yNi_{1-x}Fe_xO_2$, wherein $0<x<1$, $0 \leq y \leq 1$), nickel-manganese composite oxide (for example, $Na_yNi_{1-x}Mn_xO_2$, wherein $0<x<1$, $0 \leq y \leq 1$), nickel manganese iron composite oxide (for example, $Na_yNi_{1-x-z}Mn_xFe_zO_2$, wherein $0<x<1$, $0 \leq y \leq 1$, $0<z<1$, $0<1-x-z<1$), iron phosphate (for example, $Na_yFePO_4$, wherein $0 \leq y \leq 1$).

The particle of the positive electrode active material may be singular primary particles, secondary particles in which each of the secondary particles include aggregated primary particles, and a mixture of both the singular primary particles and the secondary particles. The primary particles of the positive electrode active material preferably have an average particle size (a diameter) of 10 μm or less, more preferably from 0.1 μm to 5 μm. The secondary particles of the positive electrode active material preferably have an average particle size (a diameter) of 100 μm or less, more preferably from 10 μm to 50 μm.

It is preferable that at least a part of the particle surface of the positive electrode active material is covered with a carbon material. The carbon material may be in the form of a layered structure, a particulate structure, or a form of aggregated particles.

As the electro-conductive agent for increasing the electron conductivity of the positive electrode layer and suppressing the contact resistance between the positive electrode layer and the current collector, examples include acetylene black, carbon black, graphite, carbon fiber having an average fiber diameter of 1 μm or less, and the like. The electro-conductive agent may be used alone or as a mixture of two or more agents.

The binder for binding the active material to the electro-conductive agent include, for example, polytetrafluoroethylene (PTFE), polyvinylidene fluoride (PVdF), fluororubber, ethylene-butadiene rubber, styrene-butadiene rubber (SBR), polypropylene (PP), polyethylene (PE), carboxymethyl cellulose (CMC), polyimide (PI), and polyacrylimide (PAI). The binder may be used alone or as a mixture of two or more binders.

With respect to the mixing ratio of the positive electrode active material, the electro-conductive agent, and the binder in the positive electrode active material layer, it is preferable that the positive electrode active material is included in a range of 70% by weight to 95% by weight, the electro-conductive agent is included in a range of 3% by weight to 20% by weight, and the binder is included in a range of 2% by weight to 10% by weight. When the mixing ratio of the electro-conductive agent is 3% by weight or more, the electro-conductivity of the positive electrode can be made good, and when the mixing ratio is 20% by weight or less, the degradation of the electrolyte on the surface of the electro-conductive agent can be reduced. When the mixing ratio of the binder is 2% by weight or more, sufficient electrode strength can be obtained, and when the mixing ratio is 10% by weight or less, the insulating portions within the electrode can be reduced.

The positive electrode can be produced, for example, by the following method. First, the positive electrode active material, the electro-conductive agent, and the binder are dispersed in an appropriate solvent to prepare a slurry. The resulting slurry is coated onto the current collector, and the coat of applied slurry is dried to form the positive electrode active material layer on the current collector. Here, for example, the slurry may be coated on one side of the current collector, or may be coated on one surface of the current collector and a surface on the reverse side. Then, the current collector and the positive electrode active material layer are subjected to pressing, for example, heat pressing, whereby the positive electrode can be produced.

3) Electrolyte

Examples of the electrolyte include an electrolytic solution containing an aqueous solvent and a first electrolyte, and a gel electrolyte obtained by combining a polymer material in this electrolytic solution. The polymer material includes, for example, polyvinylidene fluoride (PVdF), polyacrylonitrile (PAN), polyethylene oxide (PEO), and the like. The electrolytic solution will be described here. The electrolyte contains at least one anion selected from the group consisting of $NO_3^-$, $Cl^-$, $LiSO_4^-$, $SO_4^{2-}$, and $OH^-$. The electrolyte may contain one of these anions, or alternatively, two or more anions may be included. In order to distinguish an electrolyte as used for generically naming the electrolytic solution and the gel electrolyte, from an electrolyte as a solute, the electrolyte as the solute is referred to as a first electrolyte for the sake of convenience.

As an aqueous solvent, a solution including water may be used. Here, the solution including water may be pure water, or alternatively, a mixed solution or a mixed solvent of water and materials other than water.

In the above-described electrolyte, the amount of water solvent (for example, amount of water in the aqueous solvent) is preferably 1 mol or more, based on 1 mol of salt as solute. The amount of water solvent is more preferably 3.5 mol or more, based on 1 mol of salt as solute.

As the first electrolyte, there may be used a substance that becomes dissociated and thus generates the anion described above when the substance is dissolved in water, in a solution containing water, or in a solvent containing water. In particular, preferable are lithium salts that dissociate into Li ion(s) and the anion described above. Such lithium salts include, for example, $LiNO_3$, $LiCl$, $Li_2SO_4$, $LiOH$, and the like.

The lithium salt that dissociates into Li ion(s) and the above anion has a relatively high solubility in aqueous solvents. For that reason, there can be obtained an electrolyte, in which the anion concentration is of a high concentration of from 1 M to 10 M, and thus having favorable Li ion diffusibility.

The electrolyte containing $NO_3^-$ and/or $Cl^-$ may be used in a wide anion concentration range of about 0.1 M to 10 M. From the perspective of fulfilling both ion conductivity and lithium equilibrium potential, the anion concentration is preferably of a high concentration of from 3 M to 12 M. It is more preferable that the anion concentration of the electrolyte containing $NO_3^-$ or $Cl^-$ is from 8 M to 12 M.

The electrolyte containing $LiSO_4^-$ and/or $SO_4^{2-}$ may be used in an anion concentration range of about 0.05 M to 2.5 M. From the perspective of ion conductivity, the anion concentration is preferably of a high concentration of from 1.5 M to 2.5 M.

The $OH^-$ concentration in the electrolyte is desirably from $10^{-10}$ M to 0.1 M.

The electrolyte may contain both lithium ions and sodium ions.

It is preferable that the electrolyte has a pH of from 4 to 13. When the pH is less than 4, since the electrolyte would be acidic, degradation of the active material is apt to progress. When the pH is more than 13, since there is decrease in an overvoltage for oxygen generation at the positive electrode, electrolysis of the aqueous solvent is apt to progress.

The solute in the electrolyte, i.e., the first electrolyte can be determined qualitatively and quantitatively, for example, by ion chromatography. Ion chromatography is particularly preferable as the analysis method because of high sensitivity.

Examples of specific measurement conditions for the qualitative and quantitative analysis of the solute included in the electrolyte according to ion chromatography are shown below:

System: Prominence HIC-SP
Analysis Column: Shim-pack IC-SA3
Guard Column: Shim-pack IC-SA3 (G)
Eluent: 3.6 mmol/L, aqueous sodium carbonate solution
Flow Rate: 0.8 mL/minute
Column Temperature: 45° C.
Injection Amount: 50 µL
Detection: electric conductivity Whether or not water is included in the electrolyte can be examined by gas chromatography-mass spectrometry (GC-MS) measurement. Water content in the electrolyte can be calculated, for example, from emission spectrometry using ICP, or the like. In addition, the mole numbers of the solvent can be calculated from the measurement of specific weight of the electrolyte. The same electrolyte may be used on the positive electrode side and the negative electrode side, or different electrolytes may be used. In this case, the pH of the electrolyte of the positive electrode is preferably from 1 to 7. When the pH of the electrolyte of the positive electrode is 8 or more, the oxygen generation reaction resulting from electrolysis of water progresses advantageously, which is not preferable. When the pH is 1 or less, degradation of the active material proceeds, which is not preferable. The pH of the electrolyte of the negative electrode is preferably from 7 to 14. When the pH of the electrolyte is 7 or less, the hydrogen generation reaction due to the electrolysis of water advantageously advances, which is not preferable.

An additive may be added to the electrolyte. For example, a surfactant or a metal including element A may be added. The surfactant is, for example, polyoxyalkylene alkyl ether, polyethylene glycol, polyvinyl alcohol, nonylpheyl eicosaethylene glycol ether, thiourea, disodium 3,3'-dithiobis (1-propanphosphate), dimercaptothiadiazole, boric acid, oxalic acid, malonic acid, saccharin, sodium naphthalene sulfonate, gelatin, potassium nitrate, aromatic aldehyde, and heterocyclic aldehyde. The surfactants may be used alone or in combination of two or more.

In a case where a metal including element A is used as an additive (added metal) to the electrolyte, when the concentration of the metal contained in the electrolyte becomes excessive, ions cannot be exchanged between the negative electrode active material and the electrolyte due to precipitation of the metal, and the battery may not operate as a secondary battery. Therefore, care should be taken to prevent the concentration of the metal in the electrolyte from becoming excessively high. Also, care should be taken to prevent the pH of the electrolyte from greatly fluctuating due to addition of the metal. As methods to add the element A, the metal A may be added at the time of producing a slurry of the negative electrode, the metal A may be added to the electrolyte, or both methods may be used at the same time. However, when Hg among the element A is used, Hg is desirably mixed together with the active material, the electro-conductive agent, and the binder when producing the negative electrode The form of the metal to be added may be a single metal or may be one or a combination of two or more of oxides, chlorides, sulfides, nitrates, sulfates, and hydroxides. In addition, the added metal may be present in the electrolyte either as an ion or as a solid.

Whether the surfactant is contained in the electrolyte can be examined using GC-MS described above. For example, the electrolyte is extracted with hexane, and the organic solvent in the electrolyte is separated. This separated organic solvent can be identified by conducting GC-MS and nuclear magnetic resonance measurement (NMR). The added metal can be examined by ICP.

4) Separator

A separator may be disposed between the positive electrode and the negative electrode. When the separator is made from an insulating material, it is possible to prevent electrical contact between the positive electrode and the negative electrode. In addition, it is desirable to use a separator having a shape that allows the electrolyte to be capable of migrating between the positive electrode and the negative electrode. Examples of the separator include a non-woven, a film, a paper sheet, and the like. Examples of the material forming the separator may include polyolefin such as polyethylene and polypropylene, and cellulose. Preferable examples of the separator include a non-woven including cellulose fiber and a porous film including a polyolefin fiber. The separator preferably has a porosity of 60% or more. The fiber diameter is preferably 10 μm or less. When the fiber diameter is 10 μm or less, the affinity of the separator with the electrolyte is improved, thus resulting in decreased battery resistance. The more preferable range of the fiber diameter is 3 μm or less. The cellulose-including non-woven having a porosity of 60% or more can be well impregnated with the electrolyte, and can exhibit a high output performance at a low temperature to a high temperature. In addition, even during storage for a long time in a charged state, during float charging, or when exposed to overcharge, the separator does not react with the negative electrode, and short-circuiting between the negative electrode and the positive electrode caused by precipitation of dendrites of the lithium metal does not occur. The more preferable range is from 62% to 80%.

A solid electrolyte may also be used as the separator. As the separator, oxides such as LATP ($Li_{1+x}Al_xTi_{2-x}(PO_4)_3$, where $0.1 \leq x \leq 0.4$) having a NASICON framework, amorphous LATP (e.g., $Li_{2.9}PO_{3.3}N_{0.46}$), and garnet LLZ (e.g., $Li_7La_3Zr_2O_{12}$) are preferable.

The examples of solid electrolyte also include β alumina, $Na_{1+x}Zr_2Si_xP_{3-x}O_{12}$ ($0 \leq x \leq 3$), and $NaAlSi_3O_8$.

The separator preferably has a thickness of from 20 μm to 100 μm, and a density of from 0.2 $g/cm^3$ to 0.9 $g/cm^3$. Within these ranges, the mechanical strength and the reduction of battery resistance can be well-balanced, and a secondary battery having a high output and having suppressed internal short-circuiting can be provided. In addition, there is little thermal contraction of the separator under a high temperature environment, and the capability for the battery to be stored under high temperature becomes good.

5) Container Member

A container made of metal, a container made of laminate film, a container made of resin, such as polyethylene or polypropylene, may be used for a container member in which the positive electrode, the negative electrode, and the electrolyte are housed.

As the container made of metal, a metal can made of nickel, iron, stainless steel, or zinc and having an angular or cylindrical shape may be used.

The container made of resin and the container made of metal desirably have a wall thickness within a range of 1 mm or less, and more preferably 0.5 mm or less. An even more preferable range is 0.3 mm or less. The lower limit of the wall thickness is desirably 0.05 mm.

The laminate film includes, for example, a multilayer film in which a metal layer is covered with resin layers, and the like. Examples of the metal layer include a stainless steel foil, an aluminum foil, and an aluminum alloy foil. A polymer such as polypropylene (PP), polyethylene (PE), nylon, and polyethylene terephthalate (PET) may be used for the resin layer. The laminate film preferably has a thickness of 0.5 mm or less, more preferably 0.2 mm or less. The lower limit of the thickness of the laminate film is desirably 0.01 mm.

The secondary battery according to the embodiment may be applied to secondary batteries of various forms such as an angular shaped form, cylindrical shaped form, a flat-type, a thin-type, or a coin-type. The secondary battery preferably has a bipolar structure, whereby there is an advantage in that a cell having plural electrode units connected in series can be produced with a single cell.

An example of a secondary battery according to the embodiment is explained with reference to FIG. 3 to FIG. 6.

One example of a secondary battery using a container made of metal is shown in FIG. 3 and FIG. 4.

The electrode group 1 is housed in a rectangular-tube-shaped metal container 2. The electrode group 1 has a structure in which the positive electrode 3, the negative electrode 4, and the separator 5 disposed therebetween are spirally wound in a manner such that a flat shape is obtained. An electrolyte (not shown) is held in the electrode group 1. As shown in FIG. 4, a belt-shaped positive electrode lead 6 is electrically connected to each of plural positions on the edge of the positive electrode 3 located on the end surface of the electrode group 1. A belt-shaped negative electrode lead 7 is electrically connected to each of plural positions on the edge of the negative electrode 4 located on the end surface. The plural positive electrode leads 6 are bundled into one, and electrically connected to a positive electrode electro-conduction tab 8. A positive electrode terminal is composed from the positive electrode leads 6 and the positive electrode electro-conduction tab 8. The negative electrode leads 7 are bundled into one, and connected to a negative electrode electro-conduction tab 9. A negative electrode terminal is composed from the negative electrode leads 7 and the negative electrode electro-conduction tab 9. A metal sealing plate 10 is fixed over an opening of the metal container 2 by welding or the like. The positive electrode electro-conduction tab 8 and the negative electrode electro-conduction tab 9 are respectively drawn out to the outside through outlets provided on the sealing plate 10. The inner circumferential surface of each outlet of the sealing plate 10 is covered with an insulating member 11, in order to avoid short-circuiting due to contact of the sealing plate 10 with the positive electrode electro-conduction tab 8 and the negative electrode electro-conduction tab 9.

Figure 6:
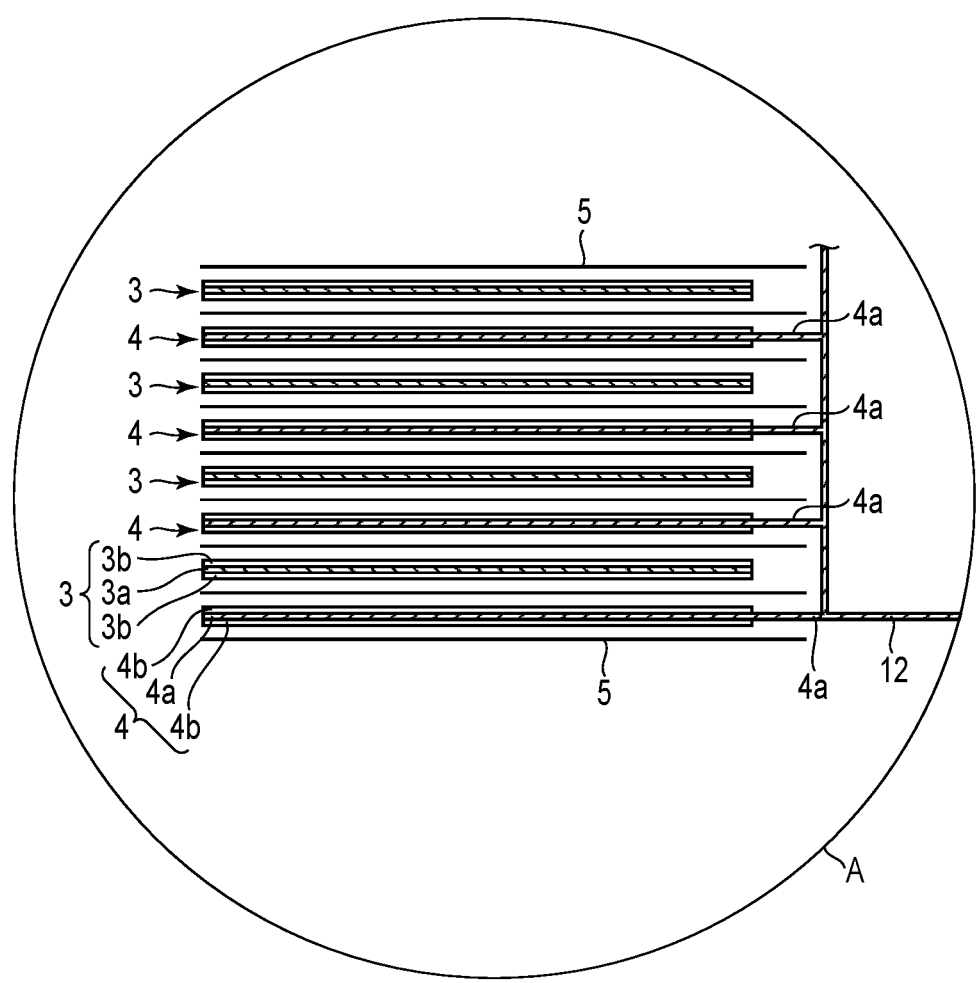
FIG. 6 is an enlarged cross-sectional view of section A in FIG. 5.

One example of a secondary battery using a container member made of the laminate film is shown in FIG. 5 and FIG. 6.

A stacked electrode group 1 is housed in a bag-form container 2. The bag-form container 2 is made of a laminate film where a metal layer is sandwiched between two resin films. As shown in FIG. 6, the stacked electrode group 1 has a structure in which positive electrodes 3 and negative electrodes 4 are alternately stacked with a separator 5 sandwiched therebetween. The electrode group 1 includes plural positive electrodes 3. Each of the plural positive electrodes 3 includes a current collector 3*a*, and positive electrode active material-including layers 3*b* formed on both of reverse surfaces of the positive electrode current collector 3*a*. The electrode group 1 includes plural negative electrodes 4. Each of the plural negative electrodes 4 includes a current collector 4*a*, and negative electrode active material-including layers 4*b* formed on both of reverse surfaces of the current collector 4*a*. An end of the current collector 4*a* of each of the negative electrodes 4 protrudes out from the positive electrodes 3. The protruded current collector 4*a* is electrically connected to a belt-shaped negative electrode terminal 12. The distal end of the belt-shaped negative electrode terminal 12 is extended out from the container 2. Although not shown in the drawings, an end of the current collector 3*a* of the positive electrode 3 protrudes from the electrodes 4 at the side opposed to the protruded end of the current collector 4*a*. The current collectors 3*a* protruding from the negative electrodes 4 are electrically connected to a belt-shaped positive electrode terminal 13. The distal end of the belt-shaped positive electrode terminal 13 is positioned on the opposite side from the negative electrode terminal 12, and extends out from a side of the container 2.

In the secondary batteries shown in FIG. 3 to FIG. 6, there may be provided a safety valve for releasing hydrogen gas that has generated within the container to the outside. As the safety valve, either one of a return type valve, which operates when an internal pressure becomes higher than a pre-determined value and functions as a sealing plug when the internal pressure is reduced, and a non-return type valve, which does not recover its function as the sealing plug once it is operated, can be used. Although the secondary batteries shown in FIG. 3 to FIG. 6 are sealed batteries, an open type battery is possible, in the case that a circulation system for converting hydrogen gas into water is included.

According to the embodiment described above, a secondary battery is provided, which includes an aqueous electrolyte, a positive electrode, and a negative electrode including a negative electrode active material that contains a Ti-containing composite oxide, wherein at least one element A selected from the group consisting of Hg, Pb, Zn, and Bi is present on a surface of the negative electrode, and an average of molar ratios (A/(A+Ti)) of the element A, each being a molar amount of the element A to a sum between the molar amount of the element A and a molar amount of Ti on the surface of the negative electrode, is 5% or greater and 40% or less, according to scanning electron microscopy-energy dispersive X-ray spectroscopy. Because the element A can be present at such a molar ratio, it is possible to suppress the hydrogen generation from the negative electrode, improve the binding property between the current collector and the active material, and further increase paths for electronic conduction. Therefore, a secondary battery having high charge-discharge efficiency and storage performance can be provided.

Second Embodiment

According to a second embodiment, a battery module including a secondary battery as a unit cell is provided. As the secondary battery, a secondary battery of the first embodiment may be used.

Examples of the battery module include a battery module including plural unit cells as structural units where has unit cells are electrically connected in series or in parallel in each structural unit, a battery module including a unit structured by plural unit cells that are electrically connected in series or a unit structured by plural unit cells that are electrically connected in parallel, and the like.

The battery module may be housed in a housing. As the housing, a metal can formed of aluminum alloy, iron, stainless steel, or the like, a plastic container, or the like may be used. The container desirably has a wall thickness of 0.5 mm or more.

Examples of the aspect in which the plural secondary batteries are electrically connected in series or in parallel include an aspect in which the plural secondary batteries each has a container and are electrically connected in series or in parallel, and an aspect in which plural electrode groups are housed in the same housing and are electrically connected in series or in parallel. Specific examples of the former are those in which positive electrode terminals and negative electrode terminals of plural secondary batteries are connected via metal bus bars (for example, aluminum, nickel, or copper). Specific examples of the latter include an aspect in which plural electrode groups are housed in one housing in a state of being electrochemically insulated from each other by partitions, and these electrode groups are electrically connected to each other in series. When the number of batteries that are electrically connected in series is in a range of 5 to 7, voltage compatibility with a lead storage battery becomes good. In order to further increase the voltage compatibility with the lead storage battery, a structure in which 5 or 6 unit cells are connected in series is preferable.

One example of the battery module is explained with reference to FIG. 7. A battery module 31, shown in FIG. 7, includes plural square-type secondary batteries $32_1$ to $32_5$ according to the first embodiment (for example, FIG. 3 or FIG. 4) as unit cells. A positive electrode electro-conduction tab 8 of battery $32_1$ and a negative electrode electro-conduction tab 9 of battery $32_2$ positioned adjacent thereto, are electrically connected by a lead 33. Further, a positive electrode electro-conduction tab 8 of the battery $32_2$ and a negative electrode electro-conduction tab 9 of battery $32_3$ positioned adjacent thereto, are electrically connected through a lead 33. In this manner, the batteries $32_1$ to $32_5$ are connected in series.

According to the battery module of the second embodiment, by including the secondary battery according to the first embodiment, there can be provided a battery module having high charge-discharge efficiency and storage performance.

Third Embodiment

According to a third embodiment, a battery pack is provided. The battery pack includes the secondary battery according to the first embodiment.

The battery pack according to the third embodiment may include one or more secondary batteries (unit cells) according to the first embodiment described above. The plural secondary batteries, which may be included in the battery pack according to the third embodiment, may be electrically connected to each other in series, in parallel or in a combination of in series and in parallel. The plural secondary batteries may be electrically connected to compose a battery module. In the case of composing a battery module from plural secondary batteries, the battery module according to the second embodiment may be used.

The battery pack according to the third embodiment may further include a protective circuit. The protective circuit has a function of controlling the charge and discharge of the secondary battery (or secondary batteries). Alternatively, a circuit included in equipment that uses the battery pack as a power source (for example, an electronic device, a vehicle such as an automobile, or the like) may be used as the protective circuit of the battery pack.

Moreover, the battery pack according to the third embodiment may further include an external power distribution terminal. The external power distribution terminal is configured to externally output current from the secondary battery and/or to input current into a unit cell. In other words, when the battery pack is used as a power source, the current is externally provided through the external power distribution terminal. When the battery pack is charged, the charge current (including a regenerative energy of a power of a vehicle such as an automobile, or the like) is provided to the battery pack through the external power distribution terminal.

An example of the battery pack according to the third embodiment is explained with reference to FIG. 8. FIG. 8 is a schematic perspective view showing one example of the battery packs.

A battery pack 40 includes a battery module including the secondary battery shown in FIGS. 5 and 6. The battery pack 40 includes a housing 41, and a battery module 42 housed in the housing 41. In the battery module 42, plural (for example, five) secondary batteries $43_1$ to $43_5$ are electrically connected in series. The secondary batteries $43_1$ to $43_5$ are stacked in a thickness direction. The housing 41 has an opening 44 on each of an upper portion and four side surfaces. The side surfaces, from which the positive and negative electrode terminals 12 and 13 of the secondary batteries $43_1$ to $43_5$ protrude, are exposed through the opening 44 of the housing 41. A positive electrode terminal 45 for output of the battery module 42 is belt-shaped, and one end thereof is electrically connected to any or all of the positive electrode terminals 13 of the secondary batteries $43_1$ to $43_5$, and the other end protrudes beyond the opening 44 of the housing 41 and thus protrudes past the upper portion of the housing 41. On the other hand, a negative electrode terminal 46 for output of the battery module 42 is belt-shaped, and one end thereof is electrically connected to any or all of the negative electrode terminals 12 of the secondary batteries $43_1$ to $43_5$, and the other end protrudes beyond the opening 44 of the housing 41 and thus protrudes past the upper portion of the housing 41.

Another example of the battery pack according to the third embodiment is explained in detail with reference to FIG. 9 and FIG. 10. FIG. 9 is an exploded perspective view showing another example of the battery pack according to the third embodiment. FIG. 10 is a block diagram showing an electric circuit of the battery pack in FIG. 9.

Plural unit cells 51, i.e. flat-type secondary batteries, are stacked such that externally extending negative electrode terminals 52 and positive electrode terminals 53 are arranged in the same direction, and the resulting stack is fastened with an adhesive tape 54 to form a battery module 55. The unit cells 51 are electrically connected to each other in series, as shown in FIG. 10.

A printed wiring board 56 is disposed facing the side surfaces of the unit cells 51 from which the negative electrode terminals 52 and the positive electrode terminals 53 extend out. A thermistor 57, a protective circuit 58, and an external power distribution terminal 59 are mounted on the printed wiring board 56, as shown in FIG. 10. An electrically insulating plate (not shown) is attached to the surface of the printed wiring board 56 facing the battery module 55 to avoid unnecessary connection with wirings of the battery module 55.

A positive electrode lead 60 is connected to a positive electrode terminal 53 located lowermost in the battery module 55, and the distal end of the lead 60 is inserted into a positive electrode-side connector 61 on the printed wiring board 56 and thus electrically connected to the connector. A negative electrode lead 62 is connected to a negative electrode terminal 52 located uppermost in the battery module 55, and the distal end of the lead 62 is inserted into a negative electrode-side connector 63 on the printed wiring board 56 and thus electrically connected to the connector. The connectors 61 and 63 are connected to the protective circuit 58 through wirings 64 and 65 formed on the printed wiring board 56.

The thermistor 57 detects the temperature of the unit cells 51, and the detection signals are sent to the protective circuit 58. The protective circuit 58 can shut off a plus wiring (positive electrode-side wiring) 66a and a minus wiring (negative electrode-side wiring) 66b between the protective circuit 58 and the external power distribution terminal 59 under predetermined conditions. A predetermined condition is, for example, the case where the temperature detected by the thermistor 57 becomes a predetermined temperature or higher. Another example of the predetermined condition is the case when the over-charge, over-discharge or over-current of the unit cells 51 is detected. The detection of the over-charge, or the like, is performed for each individual unit cell 51 or for the battery module 55. When each individual unit cell 51 is detected, the battery voltage may be detected, or the positive electrode potential or negative electrode potential may be detected. In the latter case, a lithium electrode, which is used as a reference electrode, is inserted into each individual unit cell 51. In the case of FIG. 9 and FIG. 10, a wiring 67 for voltage detection is connected to each of the unit cells 51, and the detected signals are sent to the protective circuit 58 through the wirings 67.

Protective sheets 68, made of rubber or resin, are arranged on three side planes of the battery module 55 except for the side plane where the positive electrode terminals 53 and the negative electrode terminals 52 protrude out.

The battery module 55 is housed in a housing container 69 together with the protective sheets 68 and the printed wiring board 56. That is, the protective sheets 68 are arranged on both internal surfaces along a long side direction and one internal surface along a short side direction of the housing container 69, and the printed wiring board 56 is disposed on the opposite internal surface along the short side direction. The battery module 55 is located in a space surrounded by the protective sheets 68 and the printed wiring board 56. A lid 70 is attached to the upper surface of the housing container 69.

In order to fix the battery module 55, a heat-shrinkable tape may be used instead of the adhesive tape 54. In such a case, the battery module is fastened by placing the protective sheets on both side surfaces of the battery module, revolving the heat-shrinkable tape around the battery module, and thermally shrinking the heat-shrinkable tape.

In FIGS. 9 and 10, an aspect has been shown in which the unit cells 51 are connected in series; however, in order to increase the battery capacity, the cells may be connected in parallel. Alternatively, the connection in series and the connection in parallel may be combined. Furthermore, assembled battery packs may be connected to each other in series and/or in parallel.

The aspect of the battery pack may be appropriately changed depending on the application thereof. The battery pack can be suitably used in applications in which cycle performance is demanded to be excellent when large current is taken out. Specifically the battery pack may be used, for example, as a power source of a digital camera, as a battery for installing in a vehicle such as a two-wheeled or four-wheeled hybrid electric automobile, a two-wheeled or four-wheeled electric automobile, a power-assisted bicycle, or a railway car, or as a stationary battery. In particular, the battery pack is suitably used onboard a vehicle.

In a vehicle onto which the battery pack according to the third embodiment has been installed, the battery pack is configured, for example, to recover regenerative energy from motive force of the vehicle.

According to the battery pack of the third embodiment described above, by including the lithium secondary battery according to the first embodiment, there can be provided a battery pack having high charge-discharge efficiency and storage performance.

Fourth Embodiment

According to a fourth embodiment, a vehicle is provided. The vehicle includes the battery pack according to the third embodiment.

In the vehicle according to the fourth embodiment, the battery pack is configured, for example, to recover regenerative energy from motive force of the vehicle. The vehicle according to the fourth embodiment may include a mechanism for converting kinetic energy of the vehicle into regenerative energy.

Examples of the vehicle according to the fourth embodiment include two-wheeled to four-wheeled hybrid electric automobiles, two-wheeled to four-wheeled electric automobiles, power-assisted bicycles, and railway cars.

In the vehicle according to the fourth embodiment, the installing position of the battery pack is not particularly limited. For example, when installing the battery pack on the vehicle, the battery pack may be installed in the engine compartment of the vehicle, in rear parts of the vehicle, or under seats.

An example of the vehicle according to the fourth embodiment is explained below, with reference to the drawings.

FIG. 11 is a cross-sectional view schematically showing an example of a vehicle according to the fourth embodiment.

A vehicle 200, shown in FIG. 11 includes a vehicle body 201 and a battery pack 202. The battery pack 202 may be the battery pack according to the third embodiment.

The vehicle 200, shown in FIG. 11, is a four-wheeled automobile. As the vehicle 200, for example, a two-wheeled to four-wheeled hybrid electric automobile, a two-wheeled to four-wheeled electric automobile, a power-assisted bicycle, or railway car may be used.

The vehicle 200 may include plural battery packs 202. In that case, the battery packs 202 may be connected to each other in series or in parallel. The connection may be a combination of the connection in series and the connection in parallel.

The battery pack 202 is installed in an engine compartment located at the front of the vehicle body 201. The position at which the battery pack 202 is installed is not particularly limited. The battery pack 202 may be installed in rear sections of the vehicle body 201, or under a seat. The battery pack 202 may be used as a power source of the vehicle 200. The battery pack 202 can also recover regenerative energy of motive force of the vehicle 200.

Next, with reference to FIG. 12, an aspect of operation of the vehicle according to the fourth embodiment is explained.

FIG. 12 is a view schematically showing another example of the vehicle according to the fourth embodiment. A vehicle 300, shown in FIG. 12, is an electric automobile.

The vehicle 300, shown in FIG. 12, includes a vehicle body 301, a vehicle power source 302, a vehicle ECU (electric control unit) 380, which is a master controller of the vehicle power source 302, an external terminal (an external power connection terminal) 370, an inverter 340, and a drive motor 345.

The vehicle 300 includes the vehicle power source 302, for example, in an engine compartment, in the rear sections of the automobile body, or under a seat. In FIG. 12, the position of the secondary battery installed in the vehicle 300 is schematically shown.

The vehicle power source 302 includes plural (for example, three) battery packs 312a, 312b and 312c, BMU (a battery management unit) 311, and a communication bus 310.

The three battery packs 312a, 312b and 312c are electrically connected in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack 312.

Each of the battery modules 314a to 314c includes plural single-batteries connected to each other in series. At least one of the plural single-batteries is the secondary battery according to the first embodiment. The battery modules 314a to 314c each perform charging and discharging through a positive electrode terminal 316 and a negative electrode terminal 317.

In order to collect information concerning security of the vehicle power source 302, the battery management unit 311 performs communication with the battery module monitoring units 313a to 313c and collects information such as voltages or temperatures of the single-batteries included in the battery modules 314a to 314c included in the vehicle power source 302.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each single-battery in the battery modules 314a to 314c based on commands communicated from the battery management unit 311. It is possible, however, to measure the temperatures only at several points per battery module, and the temperatures of all of the single-batteries need not be measured.

The power source for vehicle 302 may also have an electromagnetic contactor (for example, a switch unit 333 shown in FIG. 12) for switching connection between the positive electrode terminal 316 and the negative electrode terminal 317. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal provided to a coil disposed near the switch elements.

The inverter 340 converts an inputted direct current voltage to a three-phase alternate current (AC) high voltage for driving a motor. Three phase output terminal(s) of the inverter 340 is (are) connected to each three-phase input terminal of the drive motor 345. The inverter 340 controls an output voltage based on control signals from the battery management unit 311 or the vehicle ECU 380, which controls the entire operation of the vehicle.

The drive motor 345 is rotated by electric power supplied from the inverter 340. The rotation is transferred to an axle and driving wheels W via a differential gear unit, for example.

The vehicle 300 also includes a regenerative brake mechanism, though not shown. The regenerative brake mechanism rotates the drive motor 345 when the vehicle 300 is braked, and converts kinetic energy to regenerative energy, as electric energy. The regenerative energy, recovered in the regenerative brake mechanism, is inputted into the inverter 340 and converted to direct current. The direct current is inputted into the vehicle power source 302.

One terminal of a connecting line L1 is connected via a current detector (not shown) in the battery management unit 311 to the negative electrode terminal 317 of the vehicle power source 302. The other terminal of the connecting line L1 is connected to a negative electrode input terminal of the inverter 340.

One terminal of a connecting line L2 is connected through the switch unit 333 to the positive electrode terminal 316 of the vehicle power source 302. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 302, such as a remaining capacity of the vehicle power source 302, are transferred between the battery management unit 311 and the vehicle ECU 380 via communication lines.

The vehicle according to the fourth embodiment includes the battery pack according to the third embodiment. The vehicle according to the fourth embodiment, therefore, is excellent in charge-discharge efficiency and storage performance by virtue of including the battery pack having high charge-discharge efficiency and storage performance. Furthermore, since the battery pack has excellent life performance, a vehicle of high reliability can be provided.

Fifth Embodiment

According to a fifth embodiment, a stationary power supply is provided. The stationary power supply includes a battery pack according to the third embodiment. Note that instead of a battery pack according to the third embodiment, the stationary power supply may have a battery module according to the second embodiment or a secondary battery according to the first embodiment installed therein.

The stationary power supply according to the fifth embodiment includes a battery pack according to the third embodiment. Therefore, the stationary power supply according to the fifth embodiment can realize long life.

FIG. 13 is a block diagram showing an example of a system including a stationary power supply according to the fifth embodiment. FIG. 13 is a diagram showing an application example to stationary power supplies 112, 123 as an example of use of battery packs 40A, 40B according to the third embodiment. In the example shown in FIG. 13, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 40A is installed in the stationary power supply 112. The battery pack 40A can store electric power and the like supplied from the electric power plant 111. In addition, the stationary power supply 112 can supply the electric power stored in the battery pack 40A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 40A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 40B is installed in the stationary power supply 123. The customer side EMS 121 performs control to stabilize the customer side electric power system 113.

Electric power from the electric power plant 111 and electric power from the battery pack 40A are supplied to the customer side electric power system 113 through the electric power network 116. The battery pack 40B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 40B.

Note that the electric power stored in the battery pack 40B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

Examples are explained below, but the embodiments are not limited to examples described below.

Example 1

A secondary battery was produced by the following procedure.

<Production of Positive Electrode>

A lithium manganese oxide ($LiMn_2O_4$) having a spinel structure and an average particle size of 10 μm as a positive electrode active material, a graphite powder as an electro-conductive agent, and polyacrylimide (PAI) as a binder were used. The positive electrode active material, the electro-conductive agent, and the binder were mixed in a proportion of 80% by weight, 10% by weight, and 10% by weight, respectively, and the mixture was dispersed in an N-methyl-2-pyrrolidone (NMP) solvent to prepare a slurry. The prepared slurry was coated onto both of reverse surfaces of a Ti foil having a thickness of 12 μm as the positive electrode current collector, and the coat of applied slurry were dried to form positive electrode active material layers. The positive electrode current collector onto which the positive electrode active material layers were formed was subjected to pressing to produce a positive electrode having an electrode density of 3.0 $g/cm^3$ (excluding the current collector).

<Production of Negative Electrode>

An $Li_4Ti_5O_{12}$ powder having an average secondary particle size (a diameter) of 15 μm as a negative electrode active material, a graphite powder as an electro-conductive agent, and PAI as a binder were used. The negative electrode active material, the electro-conductive agent, and the binder were mixed in proportions of 80% by weight, 10% by weight, and 10% by weight, respectively, and the mixture was dispersed in an N-methyl-2-pyrrolidone (NMP) solvent to prepare a slurry. The obtained slurry was coated onto a Zn foil having a thickness 50 μm as the negative electrode current collector, and the coat of applied slurry was dried to form a negative electrode active material layer. When the slurry was coated onto the Zn foil, the slurry was coated onto only one surface of the Zn foil for the portion which had become located on the outermost periphery of the electrode group in the produced negative electrode, and the slurry was coated onto both of reverse surfaces of the Zn foil for the other portions. The negative electrode current collector onto which the negative electrode active material layer was formed was subjected to pressing to produce a negative electrode having an electrode density of 2.0 $g/cm^3$ (excluding the current collector).

<Production of Electrode Group>

The positive electrode produced as above, a non-woven separator formed of a cellulose fiber having a thickness of 20 μm, the negative electrode produced as above, and another non-woven separator were stacked in this order to obtain a stack. Next, the stack was spirally wound such that the negative electrode had become located at the outermost periphery to produce an electrode group. The electrode group was heat-pressed at 90° C. to produce a flat electrode group. The obtained electrode group was housed in a container, which was a thin metal can formed of stainless steel having a wall thickness of 0.25 mm. As the metal can, used was a can provided with a valve capable of releasing gas when the inner pressure reaches 2 atmospheric pressure or more.

<Preparation of Electrolyte>

A solution was prepared by dissolving 12 mol/L of LiCl in water. NMP was mixed into this solution so as to be a ratio of 10% by volume to the whole solution. To the obtained electrolyte, 1% by volume of polyoxyalkylene alkyl ether was added.

Next, an evaluation method for the produced cell will be described. The results are shown in Table 1.

<Storage Performance Evaluation>

(Initial Discharge Capacity)

The secondary battery was charged to 2.6 V at a constant current of a 2 C rate (conversion based on the negative electrode active material) in an environment at 25° C. after the lapse of the standby time of 12 hours from the assembly of the cell. Then the secondary battery was discharged to 2.2 V at 1 C to measure initial discharge capacity.

(Self-Discharge Rate)

After the measurement of the initial discharge capacity, charge and discharge of a predetermined number of cycles was repeated at a 1 C rate. The secondary battery was then charged to 2.6 V at a constant current of a 1 C rate (conversion based on the negative electrode active material). The charged battery was left standing for 24 hours and then discharged to 2.2 V at 1 C. As an index of the storage performance, a self-discharge rate (%) was calculated from the following formula. The self-discharge rate calculated by the following formula shows that the lower the value, the better the storage performance.

$$\begin{pmatrix} \text{Self-} \\ \text{discharge} \\ \text{rate} \end{pmatrix} = 100 - \begin{pmatrix} \text{discharge} & \text{initial} \\ \text{capacity} & \div \text{discharge} \\ \text{after 24 hours} & \text{capacity} \end{pmatrix} \times 100$$

<Measurement of Molar Ratio of Element A to Sum Between Element A and Ti>

By disassembling the cell and conducting the EDS measurement of the surface of the negative electrode, the molar ratios of the element A to the sum between the element A and Ti on the surface of the negative electrode were measured. The measurement was conducted as described in the first embodiment.

In each of Examples 2 to 49 and Comparative Examples 1 to 3, a secondary battery was prepared in the same manner as in Example 1 except that changes were made in accordance with Tables 1 to 3, namely, in the species of the negative electrode active material, the species of the positive electrode active material, the identity of the separator, the species and the concentration of the first electrolyte, the metal species of the negative electrode current collector, the species and the amount of the additive, the species and the concentration of the added metal, the standby time from the assembly of the cell, the initial charging-discharging rate, and number of charge-discharge cycles performed. Each of the secondary batteries was evaluated, the results of which are shown in Tables 4 to 6.

In the tables, "-" indicates a blank, such as "not added."

TABLE 1

| Example | Active Material Negative Electrode | Active Material Positive Electrode | Separator |
|---|---|---|---|
| 1 | $Li_4Ti_5O_{12}$ | $LiMn_2O_4$ | $Li_{1.3}Al_{0.3}Ti_{1.7}(PO_4)_3$ |
| 2 | $Li_4Ti_5O_{12}$ | $LiMn_2O_4$ | $Li_{1.3}Al_{0.3}Ti_{1.7}(PO_4)_3$ |
| 3 | $Li_4Ti_5O_{12}$ | $LiMn_2O_4$ | $Li_{1.3}Al_{0.3}Ti_{1.7}(PO_4)_3$ |
| 4 | $Li_4Ti_5O_{12}$ | $LiMn_2O_4$ | $Li_{1.3}Al_{0.3}Ti_{1.7}(PO_4)_3$ |
| 5 | $Li_4Ti_5O_{12}$ | $LiMn_2O_4$ | $Li_{1.3}Al_{0.3}Ti_{1.7}(PO_4)_3$ |
| 6 | Anatase $TiO_2$ | $LiMn_2O_4$ | $Li_{1.3}Al_{0.3}Ti_{1.7}(PO_4)_3$ |
| 7 | $TiNb_2O_7$ | $LiMn_2O_4$ | $Li_{1.3}Al_{0.3}Ti_{1.7}(PO_4)_3$ |
| 8 | $Li_4Ti_5O_{12}$ | $LiCoO_2$ | $Li_{1.3}Al_{0.3}Ti_{1.7}(PO_4)_3$ |
| 9 | $Li_4Ti_5O_{12}$ | $LiFePO_4$ | $Li_{1.3}Al_{0.3}Ti_{1.7}(PO_4)_3$ |
| 10 | $Li_4Ti_5O_{12}$ | $LiCoPO_4$ | $Li_{1.3}Al_{0.3}Ti_{1.7}(PO_4)_3$ |
| 11 | $Li_4Ti_5O_{12}$ | $LiFe_{0.9}Mn_{0.1}PO_4$ | $Li_{1.3}Al_{0.3}Ti_{1.7}(PO_4)_3$ |
| 12 | $Li_4Ti_5O_{12}$ | $LiFeSO_4F$ | $Li_{1.3}Al_{0.3}Ti_{1.7}(PO_4)_3$ |
| 13 | $Li_4Ti_5O_{12}$ | $LiNi_{0.95}Al_{0.05}O_2$ | $Li_{1.3}Al_{0.3}Ti_{1.7}(PO_4)_3$ |
| 14 | $Li_4Ti_5O_{12}$ | $LiMn_{0.9}Co_{0.1}O_2$ | $Li_{1.3}Al_{0.3}Ti_{1.7}(PO_4)_3$ |
| 15 | $Li_4Ti_5O_{12}$ | $LiMn_{0.8}Ni_{0.2}O_2$ | $Li_{1.3}Al_{0.3}Ti_{1.7}(PO_4)_3$ |
| 16 | $Li_4Ti_5O_{12}$ | $LiNi_{0.8}Co_{0.1}Mn_{0.1}O_2$ | $Li_{1.3}Al_{0.3}Ti_{1.7}(PO_4)_3$ |
| 17 | $Li_4Ti_5O_{12}$ | $LiMn_2O_4$ | Polypropylene porous film (20 μm thick) |
| 18 | $Li_4Ti_5O_{12}$ | $LiMn_2O_4$ | $Li_{1.3}Al_{0.3}Ti_{1.7}(PO_4)_3$/PTFE |
| 19 | $Li_4Ti_5O_{12}$ | $LiMn_2O_4$ | $Li_{1.3}Al_{0.3}Ti_{1.7}(PO_4)_3$ |
| 20 | $Li_4Ti_5O_{12}$ | $LiMn_2O_4$ | $Li_{1.3}Al_{0.3}Ti_{1.7}(PO_4)_3$/PTFE |
| 21 | $Li_4Ti_5O_{12}$ | $LiMn_2O_4$ | $Li_{1.3}Al_{0.3}Ti_{1.7}(PO_4)_3$ |
| 22 | $Li_4Ti_5O_{12}$ | $LiMn_2O_4$ | $Li_{1.3}Al_{0.3}Ti_{1.7}(PO_4)_3$/PTFE |
| 23 | $Li_4Ti_5O_{12}$ | $LiMn_2O_4$ | $Li_{1.3}Al_{0.3}Ti_{1.7}(PO_4)_3$ |
| 24 | $Li_4Ti_5O_{12}$ | $LiMn_2O_4$ | $Li_{1.3}Al_{0.3}Ti_{1.7}(PO_4)_3$ |
| 25 | $Li_4Ti_5O_{12}$ | $LiMn_2O_4$ | $Li_{1.3}Al_{0.3}Ti_{1.7}(PO_4)_3$ |

| Example | First Electrolyte Species | First Electrolyte Concentration | Additive Species | Additive Amount (wt %) |
|---|---|---|---|---|
| 1 | LiCl | 12 mol/L | Polyoxyalkylene alkyl ether | 1 |
| 2 | LiCl | 12 mol/L | Polyoxyalkylene alkyl ether | 1 |
| 3 | LiCl | 12 mol/L | Polyoxyalkylene alkyl ether | 1 |
| 4 | LiCl | 12 mol/L | Polyoxyalkylene alkyl ether | 1 |
| 5 | LiCl | 12 mol/L | Polyoxyalkylene alkyl ether | 1 |
| 6 | LiCl | 12 mol/L | Polyoxyalkylene alkyl ether | 1 |
| 7 | LiCl | 12 mol/L | Polyoxyalkylene alkyl ether | 1 |
| 8 | LiCl | 12 mol/L | Polyoxyalkylene alkyl ether | 1 |
| 9 | LiCl | 12 mol/L | Polyoxyalkylene alkyl ether | 1 |
| 10 | LiCl | 12 mol/L | Polyoxyalkylene alkyl ether | 1 |
| 11 | LiCl | 12 mol/L | Polyoxyalkylene alkyl ether | 1 |
| 12 | LiCl | 12 mol/L | Polyoxyalkylene alkyl ether | 1 |
| 13 | LiCl | 12 mol/L | Polyoxyalkylene alkyl ether | 1 |
| 14 | LiCl | 12 mol/L | Polyoxyalkylene alkyl ether | 1 |
| 15 | LiCl | 12 mol/L | Polyoxyalkylene alkyl ether | 1 |
| 16 | LiCl | 12 mol/L | Polyoxyalkylene alkyl ether | 1 |
| 17 | LiCl | 12 mol/L | Polyoxyalkylene alkyl ether | 1 |
| 18 | LiCl | 12 mol/L | Polyoxyalkylene alkyl ether | 1 |
| 19 | LiCl | 12 mol/L | Polyoxyalkylene alkyl ether | 1 |
| 20 | LiCl | 12 mol/L | Polyoxyalkylene alkyl ether | 1 |
| 21 | LiCl | 12 mol/L | Polyoxyalkylene alkyl ether | 1 |
| 22 | LiCl | 12 mol/L | Polyoxyalkylene alkyl ether | 1 |
| 23 | LiCl | 9 mol/L | Polyoxyalkylene alkyl ether | 1 |
| 24 | $Li_2SO_4$ | 2 mol/L | Polyoxyalkylene alkyl ether | 1 |
| 25 | LiTFSI | 4 mol/L | Polyoxyalkylene alkyl ether | 1 |

| Example | Metal Species of Negative Electrode Current Collector | Added Metal Species | Added Metal Concentration | Standby Time from Assembly of Cell (hour) | Initial Charge-discharge Rate (C) | Number of Cycles |
|---|---|---|---|---|---|---|
| 1 | Zn | — | — | 12 | 2 | 100 |
| 2 | Zn | — | — | 12 | 2 | 5 |
| 3 | Zn | $ZnCl_2$ | 10 mmol/L | 12 | 2 | 100 |
| 4 | Zn | $ZnCl_2$ | 50 mmol/L | 12 | 2 | 100 |
| 5 | Zn | — | — | 12 | 2 | 1 |
| 6 | Zn | — | — | 12 | 2 | 100 |
| 7 | Zn | — | — | 12 | 2 | 100 |
| 8 | Zn | — | — | 12 | 2 | 100 |
| 9 | Zn | — | — | 12 | 2 | 100 |
| 10 | Zn | — | — | 12 | 2 | 100 |

TABLE 1-continued

| | | | | | | |
|---|---|---|---|---|---|---|
| 11 | Zn | — | — | 12 | 2 | 100 |
| 12 | Zn | — | — | 12 | 2 | 100 |
| 13 | Zn | — | — | 12 | 2 | 100 |
| 14 | Zn | — | — | 12 | 2 | 100 |
| 15 | Zn | — | — | 12 | 2 | 100 |
| 16 | Zn | — | — | 12 | 2 | 100 |
| 17 | Zn | — | — | 12 | 2 | 100 |
| 18 | Zn | — | — | 12 | 2 | 100 |
| 19 | Zn | — | — | 12 | 2 | 100 |
| 20 | Zn | — | — | 12 | 2 | 100 |
| 21 | Zn | — | — | 12 | 2 | 100 |
| 22 | Zn | — | — | 12 | 2 | 100 |
| 23 | Zn | — | — | 12 | 2 | 100 |
| 24 | Zn | — | — | 12 | 2 | 100 |
| 25 | Zn | — | — | 12 | 2 | 100 |

TABLE 2

| | Active Material | | | | |
|---|---|---|---|---|---|
| Example | Negative Electrode | Positive Electrode | Separator | | |
| 26 | $Li_4Ti_5O_{12}$ | $LiMn_2O_4$ | $Li_{1.3}Al_{0.3}Ti_{1.7}(PO_4)_3$ | | |
| 27 | $Li_4Ti_5O_{12}$ | $LiMn_2O_4$ | $Li_{1.3}Al_{0.3}Ti_{1.7}(PO_4)_3$ | | |
| 28 | $Li_4Ti_5O_{12}$ | $LiMn_2O_4$ | $Li_{1.3}Al_{0.3}Ti_{1.7}(PO_4)_3$ | | |
| 29 | $Li_4Ti_5O_{12}$ | $LiMn_2O_4$ | $Li_{1.3}Al_{0.3}Ti_{1.7}(PO_4)_3$ | | |
| 30 | $Li_4Ti_5O_{12}$ | $LiMn_2O_4$ | $Li_{1.3}Al_{0.3}Ti_{1.7}(PO_4)_3$ | | |
| 31 | $Li_4Ti_5O_{12}$ | $LiMn_2O_4$ | $Li_{1.3}Al_{0.3}Ti_{1.7}(PO_4)_3$ | | |
| 32 | $Li_4Ti_5O_{12}$ | $LiMn_2O_4$ | $Li_{1.3}Al_{0.3}Ti_{1.7}(PO_4)_3$ | | |
| 33 | $Li_4Ti_5O_{12}$ | $LiMn_2O_4$ | $Li_{1.3}Al_{0.3}Ti_{1.7}(PO_4)_3$ | | |
| 34 | $Li_4Ti_5O_{12}$ | $LiMn_2O_4$ | $Li_{1.3}Al_{0.3}Ti_{1.7}(PO_4)_3$ | | |
| 35 | $Li_4Ti_5O_{12}$ | $LiMn_2O_4$ | $Li_{1.3}Al_{0.3}Ti_{1.7}(PO_4)_3$ | | |
| 36 | $Li_4Ti_5O_{12}$ | $LiMn_2O_4$ | $Li_{1.3}Al_{0.3}Ti_{1.7}(PO_4)_3$ | | |
| 37 | $Li_4Ti_5O_{12}$ | $LiMn_2O_4$ | $Li_{1.3}Al_{0.3}Ti_{1.7}(PO_4)_3$ | | |
| 38 | $Li_4Ti_5O_{12}$ | $LiMn_2O_4$ | $Li_{1.3}Al_{0.3}Ti_{1.7}(PO_4)_3$ | | |
| 39 | $Li_4Ti_5O_{12}$ | $LiMn_2O_4$ | $Li_{1.3}Al_{0.3}Ti_{1.7}(PO_4)_3$ | | |
| 40 | $Li_4Ti_5O_{12}$ | $LiMn_2O_4$ | $Li_{1.3}Al_{0.3}Ti_{1.7}(PO_4)_3$ | | |
| 41 | $Li_4Ti_5O_{12}$ | $LiMn_2O_4$ | $Li_{1.3}Al_{0.3}Ti_{1.7}(PO_4)_3$ | | |
| 42 | $Li_4Ti_5O_{12}$ | $LiMn_2O_4$ | $Li_{1.3}Al_{0.3}Ti_{1.7}(PO_4)_3$ | | |
| 43 | $Li_4Ti_5O_{12}$ | $LiMn_2O_4$ | $Li_{1.3}Al_{0.3}Ti_{1.7}(PO_4)_3$ | | |
| 44 | $Li_4Ti_5O_{12}$ | $LiMn_2O_4$ | $Li_{1.3}Al_{0.3}Ti_{1.7}(PO_4)_3$ | | |
| 45 | $Li_4Ti_5O_{12}$ | $LiMn_2O_4$ | $Li_{1.3}Al_{0.3}Ti_{1.7}(PO_4)_3$ | | |
| 46 | $Li_4Ti_5O_{12}$ | $LiMn_2O_4$ | $Li_{1.3}Al_{0.3}Ti_{1.7}(PO_4)_3$ | | |
| 47 | $Li_4Ti_5O_{12}$ | $LiMn_2O_4$ | $Li_{1.3}Al_{0.3}Ti_{1.7}(PO_4)_3$ | | |
| 48 | $TiO_2$ | $NaMn_2O_4$ | $Na_{3.3}Zr_2Si_2PO_{12}$ | | |
| 49 | $Li_4Ti_5O_{12}$ | $NaMn_2O_4$ | $Na_{3.3}Zr_2Si_2PO_{12}$ | | |

| | First Electrolyte | | Additive | |
|---|---|---|---|---|
| Example | Species | Concentration | Species | Amount (wt %) |
| 26 | LiFSI | 5 mol/L | Polyoxyalkylene alkyl ether | 1 |
| 27 | LiOH | 6 mol/L | Polyoxyalkylene alkyl ether | 1 |
| 28 | $LiNO_3$ | 6 mol/L | Polyoxyalkylene alkyl ether | 1 |
| 29 | LiCl | 12 mol/L | Polyetheylene glycol | 1 |
| 30 | LiCl | 12 mol/L | Polyvinyl alcohol | 1 |
| 31 | LiCl | 12 mol/L | Nonylpheny1 eicosaethylene glycol ether | 1 |
| 32 | LiCl | 12 mol/L | Thiourea | 0.5 |
| 33 | LiCl | 12 mol/L | disodium 3,3'-dithio bis (1-propanphosphate) | 0.5 |
| 34 | LiCl | 12 mol/L | dimercaptothiadiazole | 0.5 |
| 35 | LiCl | 12 mol/L | Boric acid | 1 |
| 36 | LiCl | 12 mol/L | Oxalic acid | 1 |
| 37 | LiCl | 12 mol/L | Malonic acid | 1 |
| 38 | LiCl | 12 mol/L | Polyoxyalkylene alkyl ether | 1 |
| 39 | LiCl | 12 mol/L | Polyoxyalkylene alkyl ether | 1 |
| 40 | LiCl | 12 mol/L | Polyoxyalkylene alkyl ether | 1 |
| 41 | LiCl | 12 mol/L | Polyoxyalkylene alkyl ether | 1 |
| 42 | LiCl | 12 mol/L | Polyoxyalkylene alkyl ether | 1 |
| 43 | LiCl | 12 mol/L | Polyoxyalkylene alkyl ether | 1 |
| 44 | LiCl | 12 mol/L | Polyoxyalkylene alkyl ether | 1 |
| 45 | LiCl | 12 mol/L | Polyoxyalkylene alkyl ether | 1 |
| 46 | LiCl | 12 mol/L | Polyoxyalkylene alkyl ether | 1 |
| 47 | LiCl | 12 mol/L | Polyoxyalkylene alkyl ether | 1 |

TABLE 2-continued

| | | | | |
|---|---|---|---|---|
| 48 | NaCl | 6 mol/L | Polyoxyalkylene alkyl ether | 1 |
| 49 | NaCl | 6 mol/L | Polyoxyalkylene alkyl ether | 1 |

| Example | Metal Species of Negative Electrode Current Collector | Added Metal Species | Added Metal Concentration | Standby Time from Assembly of Cell (hour) | Initial Charge-discharge Rate (C) | Number of Cycles |
|---|---|---|---|---|---|---|
| 26 | Zn | — | — | 12 | 2 | 100 |
| 27 | Zn | — | — | 12 | 2 | 100 |
| 28 | Zn | — | — | 12 | 2 | 100 |
| 29 | Zn | — | — | 12 | 2 | 200 |
| 30 | Zn | — | — | 12 | 2 | 200 |
| 31 | Zn | — | — | 12 | 2 | 200 |
| 32 | Zn | — | — | 12 | 2 | 200 |
| 33 | Zn | — | — | 12 | 2 | 200 |
| 34 | Zn | — | — | 12 | 2 | 200 |
| 35 | Zn | — | — | 12 | 2 | 200 |
| 36 | Zn | — | — | 12 | 2 | 200 |
| 37 | Zn | — | — | 12 | 2 | 200 |
| 38 | Al | $ZnCl_2$ | 50 mmol/L | 0 | 2 | 100 |
| 39 | Al | $ZnCl_2$ | 200 mmol/L | 0 | 2 | 100 |
| 40 | Al | $ZnSO_4$ | 50 mmol/L | 0 | 2 | 100 |
| 41 | Zn | — | — | 24 | 2 | 100 |
| 42 | Zn | — | — | 48 | 2 | 100 |
| 43 | Zn | — | — | 12 | 4 | 100 |
| 44 | Zn | — | — | 12 | 6 | 100 |
| 45 | Al | $PbSO_4$ | 10 mmol/L | 12 | 2 | 100 |
| 46 | Al | $BiSO_4$ | 10 mmol/L | 12 | 2 | 100 |
| 47 | Al | Hg | 5 mmol/L | 12 | 2 | 100 |
| 48 | Zn | — | — | 3 | 0.5 | 200 |
| 49 | Zn | — | — | 3 | 0.5 | 200 |

TABLE 3

| Comparative Example | Active Material Negative Electrode | Active Material Positive Electrode | Separator | First Electrolyte Species | First Electrolyte Concentration | Additive Species | Additive Amount (wt %) |
|---|---|---|---|---|---|---|---|
| 1 | $Li_4Ti_5O_{12}$ | $LiMn_2O_4$ | $Li_{1.3}Al_{0.3}Ti_{1.7}(PO_4)_3$ | LiCl | 12 mol/L | Polyoxyalkylene alkyl ether | 1 |
| 2 | $Li_4Ti_5O_{12}$ | $LiMn_2O_4$ | $Li_{1.3}Al_{0.3}Ti_{1.7}(PO_4)_3$ | LiCl | 12 mol/L | Polyoxyalkylene alkyl ether | 1 |
| 3 | $Li_4Ti_5O_{12}$ | $LiMn_2O_4$ | $Li_{1.3}Al_{0.3}Ti_{1.7}(PO_4)_3$ | LiCl | 12 mol/L | — | — |

| Comparative Example | Metal Species of Negative Electrode Current Collector | Added Metal Species | Added Metal Concentration | Standby Time from Assembly of Cell (hour) | Initial Charge-discharge Rate (C) | Number of Cycles |
|---|---|---|---|---|---|---|
| 1 | Zn | — | — | 0 | 2 | 100 |
| 2 | $Al_2O_3$ | — | — | 12 | 2 | 100 |
| 3 | Zn | — | — | 12 | 2 | 100 |

TABLE 4

| Example | Molar Ratio of Element A to Total of Element A and Ti (%) | Difference between Maximum Value and Minimum Value of Molar Ratio of Element A to Total of Element A and Ti (%) | Self-Discharge Rate (%) |
|---|---|---|---|
| 1 | 15 | 32 | 0.5 |
| 2 | 5 | 13 | 2.0 |
| 3 | 17 | 33 | 0.3 |
| 4 | 20 | 41 | 0.2 |
| 5 | 5 | 12 | 1.2 |
| 6 | 15 | 31 | 1.0 |

TABLE 4-continued

| Example | Molar Ratio of Element A to Total of Element A and Ti (%) | Difference between Maximum Value and Minimum Value of Molar Ratio of Element A to Total of Element A and Ti (%) | Self-Discharge Rate (%) |
|---|---|---|---|
| 7 | 15 | 31 | 5.0 |
| 8 | 15 | 31 | 0.5 |
| 9 | 15 | 31 | 0.5 |
| 10 | 15 | 31 | 0.5 |
| 11 | 15 | 31 | 0.5 |
| 12 | 15 | 31 | 0.5 |
| 13 | 15 | 31 | 0.5 |
| 14 | 15 | 31 | 0.5 |
| 15 | 15 | 31 | 0.5 |
| 16 | 15 | 31 | 0.5 |
| 17 | 15 | 31 | 40.0 |
| 18 | 15 | 31 | 0.5 |
| 19 | 15 | 31 | 0.5 |
| 20 | 15 | 31 | 0.5 |
| 21 | 15 | 31 | 0.5 |
| 22 | 15 | 31 | 0.7 |
| 23 | 15 | 31 | 0.8 |
| 24 | 15 | 31 | 0.5 |
| 25 | 15 | 31 | 0.6 |

TABLE 5

| Example | Molar Ratio of Element A to Total of Element A and Ti (%) | Difference between Maximum Value and Minimum Value of Molar Ratio of Element A to Total of Element A and Ti (%) | Self-Discharge Rate (%) |
|---|---|---|---|
| 26 | 15 | 32 | 1.0 |
| 27 | 15 | 31 | 0.8 |
| 28 | 15 | 31 | 0.5 |
| 29 | 17 | 34 | 0.3 |
| 30 | 14 | 29 | 0.6 |
| 31 | 14 | 29 | 0.6 |
| 32 | 16 | 31 | 0.5 |
| 33 | 16 | 31 | 0.6 |
| 34 | 13 | 24 | 0.7 |
| 35 | 16 | 30 | 0.5 |
| 36 | 13 | 25 | 0.7 |
| 37 | 12 | 24 | 0.8 |
| 38 | 15 | 30 | 0.5 |
| 39 | 20 | 40 | 0.3 |
| 40 | 15 | 32 | 0.5 |
| 41 | 16 | 33 | 0.4 |
| 42 | 17 | 34 | 0.3 |
| 43 | 15 | 31 | 0.5 |
| 44 | 15 | 31 | 0.5 |
| 45 | 9 | 20 | 0.8 |
| 46 | 8 | 18 | 0.9 |
| 47 | 6 | 15 | 1.2 |
| 48 | 15 | 31 | 0.5 |
| 49 | 15 | 31 | 0.5 |

TABLE 6

| Comparative Example | Molar Ratio of Element A to Total of Element A and Ti (%) | Difference between Maximum Value and Minimum Value of Molar Ratio of Element A to Total of Element A and Ti (%) | Self-Discharge Rate (%) |
|---|---|---|---|
| 1 | 3 | 2.6 | 70 |
| 2 | 0 | 0 | 100 |
| 3 | 2 | 2 | 80 |

In comparison between Examples 1 to 49 and Comparative Examples 1 to 3, Examples 1 to 49 showed higher values in terms of the molar ratio of the element A to the sum of element A and Ti and also showed lower self-discharge rates. This shows that in Examples 1 to 49, the compound containing the element A was present in a large amount on the surface of the negative electrode, so that it was possible to suppress the generation of hydrogen from the negative electrode and suppress detachment between the negative electrode current collector and the negative electrode active material. Regarding the difference between the maximum value and minimum value of the molar ratio of the element A to the sum of element A and Ti, the difference was greater than 3% for Examples 1 to 49, while the difference was less than 3% for Comparative Examples 1 to 3. Since the difference in between the maximum and minimum values being 3% or greater indicates that the element A is sufficiently present on the electrode surface, this too can be considered to have contributed to suppressing hydrogen generation from the electrode surface. Therefore, it was possible to improve the charge-discharge efficiency, and the storage performance could be improved.

According to at least one embodiment and example described above, a secondary battery is provided. This secondary battery is provided with an aqueous electrolyte, a positive electrode, and a negative electrode, the negative electrode including a negative electrode active material, the negative electrode active material containing a Ti-containing composite oxide, wherein at least one element A selected from the group consisting of Hg, Pb, Zn, and Bi is present on a surface of the negative electrode, and an average of molar ratios (A/(A+Ti)) of the element A, each being a molar amount of the element A to a sum between the molar amount of the element A and a molar amount of Ti on the surface of the negative electrode, is greater than or equal to 5% and less than or equal to 40%, according to scanning electron microscopy-energy dispersive X-ray spectroscopy. Therefore, a secondary battery excellent in charge-discharge efficiency and storage performance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery, comprising:
an aqueous electrolyte;
a positive electrode; and a negative electrode, the negative electrode comprising a negative electrode active material, the negative electrode active material comprising a Ti-containing composite oxide, at least one element A selected from the group consisting of Hg, Pb, Zn, and Bi being present on a surface of the negative electrode, and an average of molar ratios (A/(A+Ti)) of the element A being more than or equal to 5% and less than or equal to 40%, each of the molar ratios being a molar amount of the element A to a sum between the molar amount of the element A and a molar amount of Ti on the surface of the negative electrode, according to scanning electron microscopy-energy dispersive X-ray spectroscopy.

2. The secondary battery according to claim 1, wherein the average of molar ratios (A/(A+Ti)) is more than or equal to 10% and less than or equal to 20%.

3. The secondary battery according to claim 1, wherein a difference between a maximum value and a minimum value in the molar ratios (A/(A+Ti)) is 3% or more.

4. The secondary battery according to claim 1, wherein the negative electrode comprises a current collector and a negative electrode active material layer disposed on the current collector, the negative electrode active material layer comprises the negative electrode active material, and the current collector comprises the element A.

5. The secondary battery according to claim 1, wherein the aqueous electrolyte comprises a surfactant.

6. The secondary battery according to claim 1, wherein the aqueous electrolyte comprises the element A.

7. The secondary battery according to claim 1, wherein the aqueous electrolyte comprises a surfactant and the element A.

8. The secondary battery according to claim 1, wherein the negative electrode active material comprises at least one selected from the group consisting of an oxide of titanium, lithium titanium oxide, and lithium titanium composite oxide.

9. A battery pack comprising the secondary battery according to claim 1.

10. The battery pack according to claim 9, further comprising an external power distribution terminal and a protective circuit.

11. The battery pack according to claim 9, further comprising plural of the secondary battery,
wherein the secondary batteries are electrically connected in series, in parallel, or in combination of in-series connection and in-parallel connection.

12. A vehicle comprising the battery pack according to claim 9.

13. The vehicle according to claim 12, wherein the battery pack is configured to recover a regenerative energy of power of the vehicle.

14. The vehicle according to claim 12, which comprises a mechanism configured to convert kinetic energy of the vehicle into regenerative energy.

15. A stationary power supply comprising the battery pack according to claim 9.

* * * * *